(12) United States Patent
Chen

(10) Patent No.: US 12,190,883 B2
(45) Date of Patent: Jan. 7, 2025

(54) SPEAKER RECOGNITION ADAPTATION

(71) Applicant: Amazon Technologies, Inc., Seattle, WA (US)

(72) Inventor: Zeya Chen, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/329,635

(22) Filed: Jun. 6, 2023

(65) Prior Publication Data

US 2024/0013784 A1    Jan. 11, 2024

Related U.S. Application Data

(63) Continuation of application No. 16/912,119, filed on Jun. 25, 2020, now Pat. No. 11,763,806.

(51) Int. Cl.
| | |
|---|---|
| *G10L 15/22* | (2006.01) |
| *G10L 15/08* | (2006.01) |
| *G10L 17/00* | (2013.01) |
| *G10L 17/14* | (2013.01) |

(52) U.S. Cl.
CPC ............ *G10L 15/22* (2013.01); *G10L 15/08* (2013.01); *G10L 17/00* (2013.01); *G10L 17/14* (2013.01); *G10L 2015/088* (2013.01); *G10L 2015/223* (2013.01)

(58) Field of Classification Search
CPC ... G10L 15/22; G10L 15/08; G10L 2015/088; G10L 2015/223
See application file for complete search history.

(56) References Cited

U.S. PATENT DOCUMENTS

| | | | |
|---|---|---|---|
| 11,355,102 B1* | 6/2022 | Mishchenko | G10L 15/063 |
| 2017/0372694 A1* | 12/2017 | Ushio | G10L 21/0272 |
| 2019/0156835 A1* | 5/2019 | Church | G10L 15/30 |
| 2019/0341057 A1* | 11/2019 | Zhang | G10L 25/78 |
| 2021/0183367 A1* | 6/2021 | Sharifi | G06N 3/045 |

* cited by examiner

*Primary Examiner* — Linda Wong
(74) *Attorney, Agent, or Firm* — Pierce Atwood LLP

(57) ABSTRACT

Techniques for generating, from first speaker recognition data corresponding to at least a first word, second speaker recognition data corresponding to at least a second word are described. During a speaker recognition enrollment process, a device receives audio data corresponding to one or more prompted spoken inputs comprising the at least first word. Using the prompted spoken input(s), the first speaker recognition data (specific to that least first word) is generated. Sometime thereafter, a user may indicate that speaker recognition processing is to be performed using at least a second word. Rather than have the user go through the speaker recognition enrollment process a second time, the device (or a system) may apply a transformation model to the first speaker recognition data to generate second speaker recognition data specific to the at least second word.

20 Claims, 18 Drawing Sheets

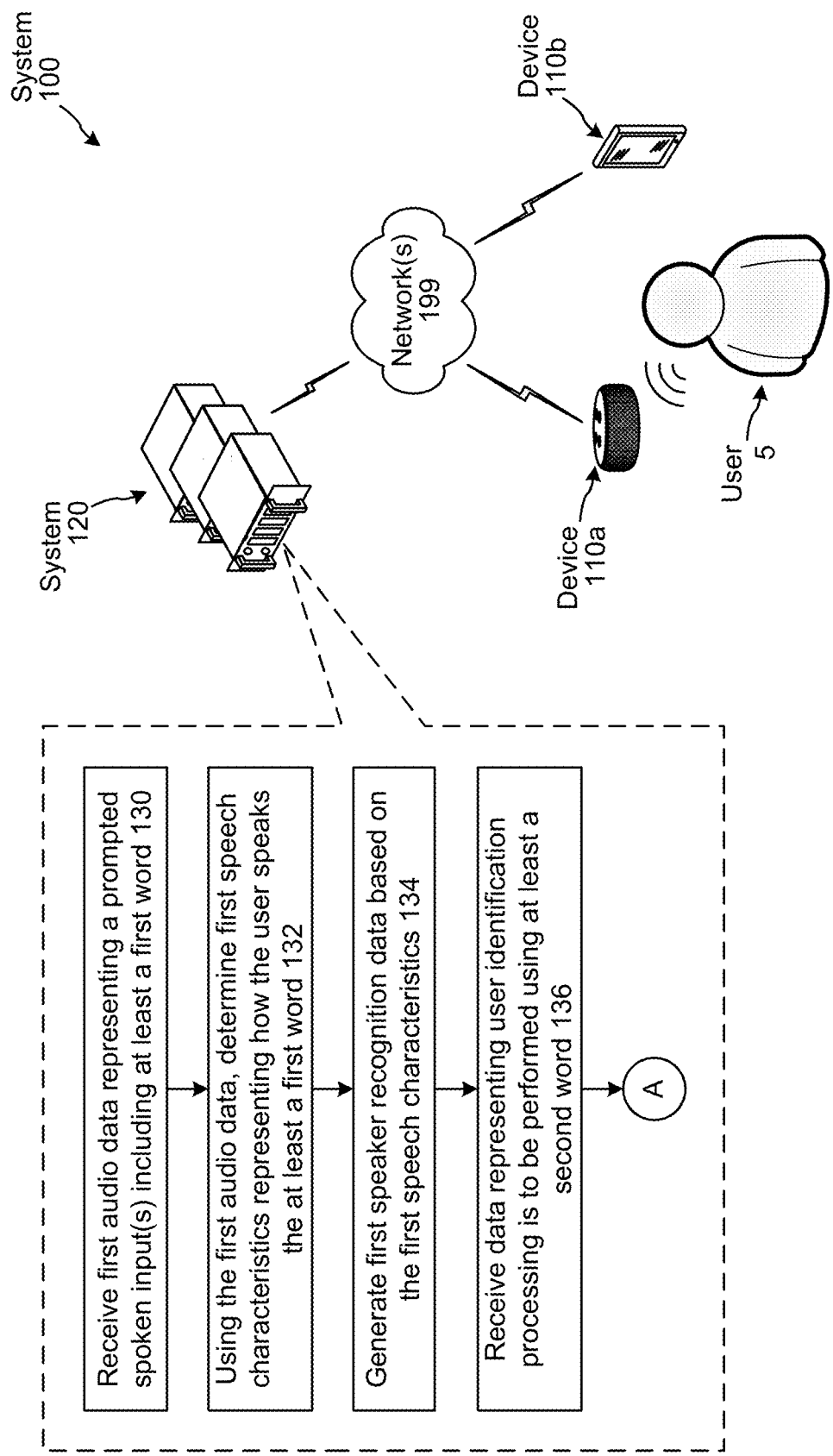

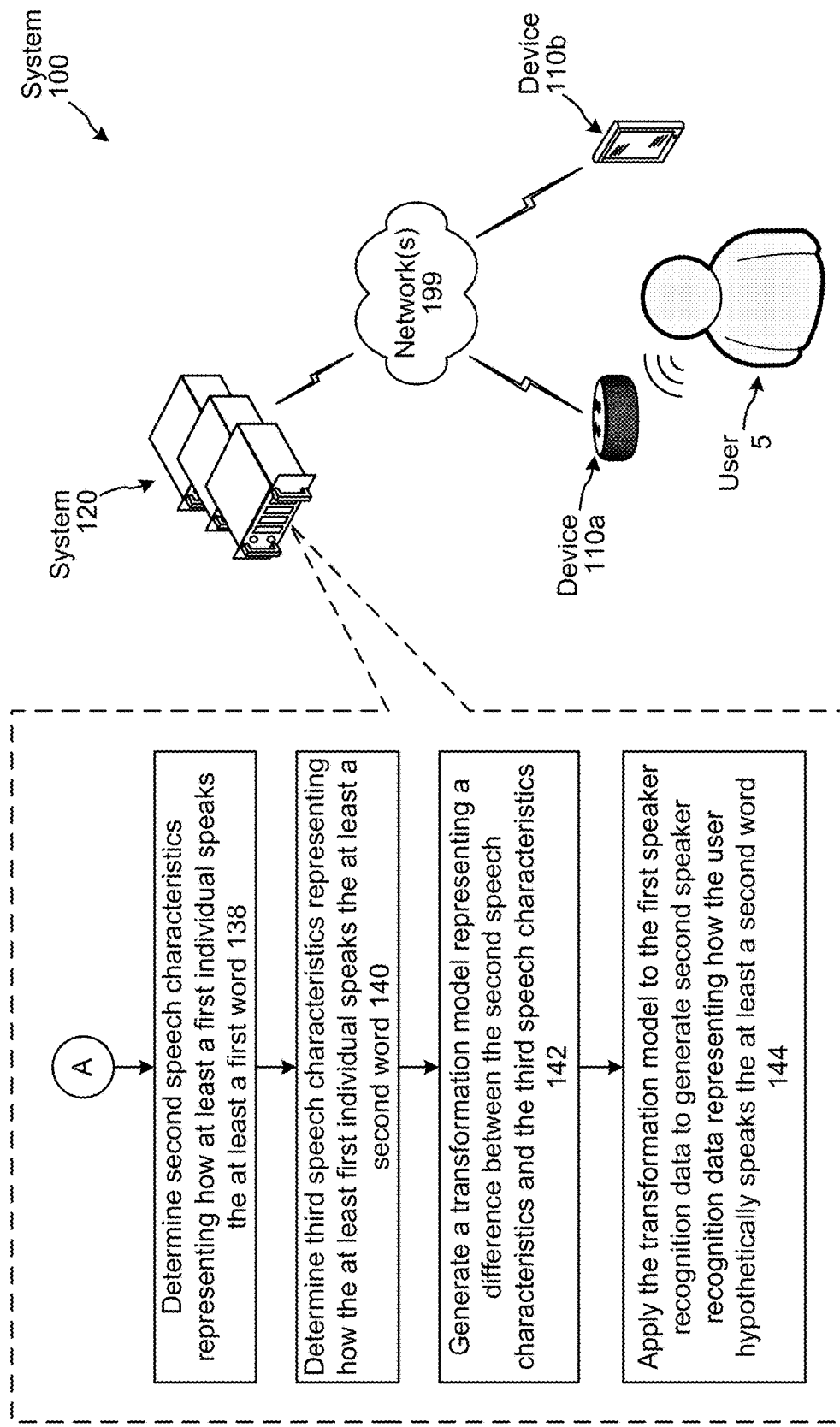

SPEAKER RECOGNITION ADAPTATION

CROSS-REFERENCE TO RELATED APPLICATION

This application is a continuation of, and claims priority to, U.S. Non-Provisional patent application Ser. No. 16/912,119, filed Jun. 25, 2020, and entitled "SPEAKER RECOGNITION ADAPTATION." The above application is hereby incorporated by reference in its entirety.

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are a conceptual diagram illustrating a system configured to generate, from first speaker recognition data specific to at least a first word, second speaker recognition data specific to at least a second word, according to embodiments of the present disclosure.

DETAILED DESCRIPTION

Figure 2:
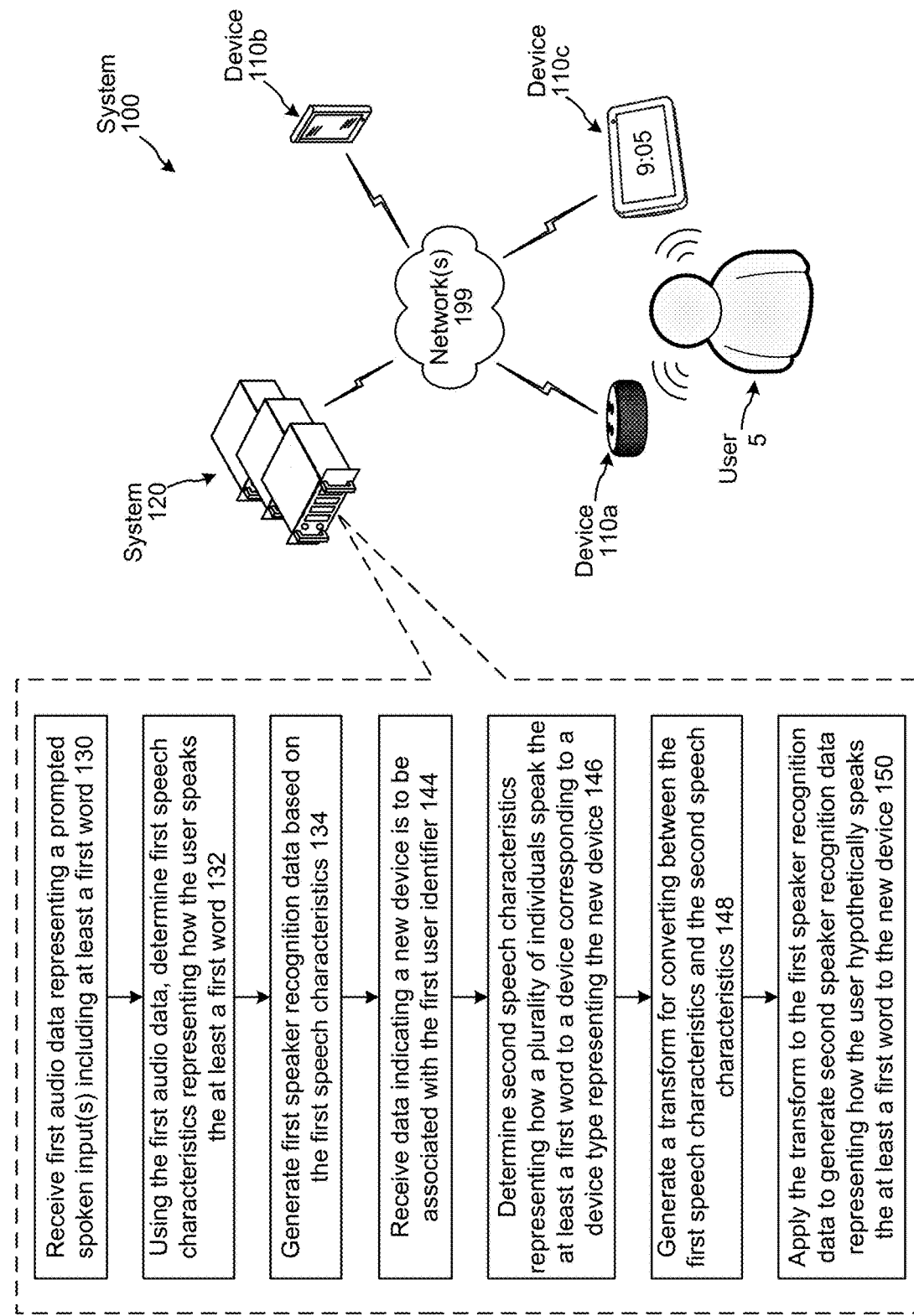
FIG. 2 is a conceptual diagram illustrating a system configured to generate, from first speaker recognition data specific to at least a first word and a first device, second speaker recognition data specific to the at least a first word and a second device, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may be configured to cause actions to be performed in response to spoken inputs. Moreover, the system may tailor such actions based on recognizing the user. For example, for the spoken input "play workout music," the system may output music from a user's workout playlist. For further example, for the spoken input "turn on the lights," the system may turn on "smart" lights associated with a user's profile. In another example, for the spoken input "play my favorite movie," the system may output a movie tagged as a favorite movie in a profile of the user. In the foregoing examples, actions correspond to the outputting of music, the turning on of "smart" lights, and the outputting of the movie. Thus, as used herein, an "action" may refer to a result of a system processing a user input.

The system may be configured to recognize/identify a user based on characteristics (e.g., speech, acoustic, etc.) of a spoken input. Such recognition processing may be referred to as speaker recognition processing. In order for the system to perform speaker recognition processing with respect to a user, the user may need to perform an enrollment process. During the enrollment process, the system may prompt the user to speak one or more spoken inputs, with each requested spoken input including one or more words to be used to perform speaker recognition processing at runtime. Upon the user speaking the prompted spoken inputs, the system may generate a speaker recognition model to be used at runtime to recognize the user when the user speaks a spoken input. In at least some embodiments, the system may prompt the user to speak an input(s) including a wakeword (runtime detection of which may cause a device to transition from a sleep state to an active state), such that the wakeword may be used at runtime to wake a device as well as perform speaker recognition processing. Example wakewords include "Alexa," "Computer," "Echo," "Amazon," and "Ask Sam" (an example of a multi-word wakeword).

Sometime after the system generates the speaker recognition model for a user, the user may indicate to the system (e.g., via a spoken input or other natural language input (e.g., a text-based input), selection of a button presented on a display of a device, etc.) that the user wants speaker recognition processing to be performed with respect to a different word(s). In at least some cases, such an indication may occur when the user provides a user input indicating that the user wants to use a different wakeword to wake/activate functionality of one or more devices.

According to the present disclosure, the system may generate another speaker recognition model specific to the new word(s). The other speaker recognition model may be generated using the user's initial speaker recognition model. The other speaker recognition model may be used to perform speaker recognition processing going forward, in particular for the additional words indicated by the user. It will thus be appreciated that the teachings herein provide beneficial user experiences by enabling a user to configure how speaker recognition processing is to be performed without the user needing to perform an enrollment process multiple times for different words.

As described above, first speaker recognition data may be generated in response to the user 5 performing an enrollment process in which the user 5 speaks certain prompted speech. In at least some embodiments, the first speaker recognition data may be generated without requiring a user 5 perform such an enrollment process. For example, with user permission, the system may store audio data corresponding to spoken inputs received by a device 110 (and/or feature vectors representing the audio data). Over time, the system may determine one or more distance groupings of audio data/feature vectors corresponding to the same or similar speech characteristics. The system may thereafter generate the first speaker recognition data to represent the speech characteristics of a grouping.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

For example, a user may go through an enrollment process, which results in the generation of a first speaker recognition profile specific to a first word(s) (e.g., the wakeword "Alexa," "Ask Sam," or the like). Thereafter the user may indicate the user wants one or more devices to be woken up using a second word(s) (e.g., the wakeword "Computer," "Ask Tim," or the like). Instead of prompting the user to say enrollment phrases for the second word(s), the system may identify speech characteristics corresponding to how one or more other individuals speak the second word(s), and may use the speech characteristics to generate a second speaker recognition profile for the user that is specific to the second word(s).

For further example, a user may go through an enrollment process, which results in the generation of a first speaker recognition profile specific to a first word(s) (e.g., the wakeword "Alexa," "Ask Sam," or the like) and a first device used to gather the enrollment utterances. Thereafter the user may purchase a second device that has different capabilities (e.g., a different microphone quality) than the first device. Instead of prompting the user to say enrollment phrases to the second device, the system may identify speech characteristics corresponding to how one or more other individuals speak the first word(s) to the second device type, and may use the speech characteristics to generate a second speaker recognition profile for the user that is specific to the first word(s) and the second device.

FIGS. 1A-1B illustrate a system 100 configured to generate, from first speaker recognition data specific to at least a first word, second speaker recognition data specific to at least a second word. Although the figures and discussion of the present disclosure illustrate certain steps in a particular order, the steps described may be performed in a different order (as well as certain steps removed or added) without departing from the present disclosure. As shown in FIGS. 1A-1B, the system 100 may include one or more devices 110*a*/110*b* (local to a user 5) in communication with a system 120 across one or more networks 199.

The device 110*b* may be a smart phone, tablet, or other device including a display. The device 110*b* may have installed thereon and may execute a companion application that enables the device 110*b* to communicate with the system 120. An example of such a companion application is the Amazon Alexa application.

While executing the companion application, the device 110*b* may receive a user input (e.g., selection of one or more displayed buttons, entering of text inputs, gestures, etc.) representing the user 5 wants to enroll in speaker recognition functionality with respect to spoken inputs received by the device 110*a*. The device 110*b* may send to the system 120, via the companion application, data representing a device identifier (of the device 110*a*) and the user 5's desire to enroll in speaker recognition functionality provided by the system 100 (e.g., performed by the system 120 and/or locally by the device 110*a*). The system 120 may thereafter cause the device 110*a* to output synthesized speech (generated from TTS processing) and/or display text prompting the user 5 to speak one or more spoken inputs including at least a first word (e.g., a wakeword to be used to wake the device 110*a*).

The device 110*a* may receive audio representing the prompted spoken input(s), may generate first audio data representing the audio, and may send the first audio data to the system 120.

After the system 120 receives (130) the first audio data from the device 110*a*, the system 120 may determine (132) first speech characteristics (in the first audio data) representing how the user 5 speaks the at least a first word. The system 120 may generate (134) first speaker recognition data based on the first speech characteristics. Details of how to determine the first speech characteristics and generate the first speaker recognition data are described below with respect to FIG. 8. In at least some embodiments, for storage and/or privacy considerations, the system 120 may delete the first audio data after the system 120 determines the first speech characteristics, or after the system 120 generates the first speaker recognition data.

Since the system 120 generates the first speaker recognition data based on first speech characteristics corresponding to a prompted spoken input(s) spoken by the user 5 and received by the device 110a, the first speaker recognition data may be specifically configured to recognize (at runtime) when the user 5 speaks a spoken input (including the at least a first word) received by the device 110a. To this end, the system 120 may associate the first speaker recognition data with a user identifier, corresponding to the user 5, and the device 110a's identifier for recall at runtime when the system 120 receives audio data (representing a runtime spoken input) from the device 110a.

Sometime after the system 120 generates the first speaker recognition data, the device 110b (e.g., while executing the companion application) may receive a user input (e.g., selection of one or more displayed buttons) representing the user 5 wants speaker recognition functionality to be performed with respect to at least a second word when the user 5 provides a spoken input to the device 110a. The device 110b may send to the system 120, via the companion application, data representing the device 110a's identifier and the user 5's desire to now have speaker recognition functionality be performed using at least the second word.

The system 120 may not store data (e.g., audio data and/or speech characteristics) representing how the user 5 speaks the at least a second word. However, the system 120 may store (or otherwise have access to) speech characteristics representing how various individuals speak the at least second word. For example, the system 120 may store (or otherwise have access to) speech characteristics representing how various users of the system 120 speak the at least second word. For further example, the system 120 may store (or otherwise have access to) speech characteristics representing how various employees (of a corporate entity associated with the system 120) speak the at least second word. The system 120 may obtain prior authorization from individuals prior to storing (or otherwise having access to) such speech characteristics.

After the system 120 receives (136) the data representing the user 5's desire to have speaker recognition functionality be performed using at least the second word, the system 120 may determine (138) second speech characteristics representing how at least a first individual (who is not the user 5) speaks the at least a first word, as well as determine (140) third speech characteristics representing how the at least first individual speaks the at least second word. The system 120 may not identify speech characteristics of other users as being associated with particular other users. Rather, the system 120 may determine speech characteristics corresponding to various alphanumeric values, but the alphanumeric values may not be usernames or other user identifying information.

The system 120 may generate (142) a transform model representing a between the second speech characteristics (and the third speech characteristics. For example, the transformation model may be a deep neural network (DNN) trained using the second speech characteristics as input and the third speech characteristics as a target. Further details of how to determine the second and third speech characteristics, and generate the transformation model are described below with respect to FIGS. 9 and 10.

The system 120 may apply (144) the transformation model to the first speaker recognition data to generate second speaker recognition data representing how the user 5 hypothetically speaks the at least a second word. Since the first speaker recognition data was associated with the user 5's identifier and the device 110a's identifier, the system 120 may also associate the second speaker recognition data with the user 5's identifier and the device 110a's identifier. Such may enable the system 120 to attempt to recognize when the user 5 thereafter speaks a runtime spoken input to the device 110a.

The teachings of the present disclosure are not limited to adapting speaker recognition processing to be specific to different words. In at least some embodiments, speaker recognition processing may be adapted to account for capabilities of different devices. FIG. 2 illustrates how the system 100 may be configured to generate, from first speaker recognition data specific to at least a first word and a first device, second speaker recognition data specific to the at least a first word and a second device. As shown in FIG. 2, the system 100 may include devices 110a/110b/110c (local to the user 5) in communication with the system 120 across the one or more networks 199.

The device 110b may be a smart phone, tablet, or other device including a display. The device 110b may have installed thereon and may execute a companion application that enables the device 110b to communicate with the system 120. An example of such a companion application is the Amazon Alexa application.

While executing the companion application, the device 110b may receive a user input (e.g., selection of one or more displayed buttons) representing the user 5 wants to enroll in speaker recognition functionality with respect to spoken inputs received by the device 110a. The device 110b may send to the system 120, via the companion application, data representing a device identifier (of the device 110a) and the user 5's desire to enroll in speaker recognition functionality provided by the system 100 (e.g., performed by the system 120 and/or locally by the device 110a). The system 120 may thereafter cause the device 110a to output synthesized speech (generated from TTS processing) prompting the user 5 to speak one or more spoken inputs including at least a first word (e.g., a wakeword to be used to wake the device 110a).

The device 110a may receive audio representing the prompted spoken input(s), may generate first audio data representing the audio, and may send the first audio data to the system 120.

After the system 120 receives (130) the first audio data from the device 110a, the system 120 may determine (132) first speech characteristics (in the first audio data) representing how the user 5 speaks the at least a first word. The system 120 may generate (134) first speaker recognition data based on the first speech characteristics. In at least some embodiments, for storage and/or privacy considerations, the system 120 may delete the first audio data after the system 120 determines the first speech characteristics, or after the system 120 generates the first speaker recognition data.

Since the system 120 generates the first speaker recognition data based on first speech characteristics corresponding to a prompted spoken input(s) spoken by the user 5 and received by the device 110a, the first speaker recognition data may be specifically configured to recognize (at runtime) when the user 5 speaks a spoken input (including the at least a first word) received by the device 110a. To this end, the system 120 may associate the first speaker recognition data with a user identifier, corresponding to the user 5, and the device 110*a*'s identifier for recall at runtime when the system 120 receives audio data (representing a runtime spoken input) from the device 110*a*.

Sometime after the system 120 generates the first speaker recognition data, the device 110*b* (e.g., while executing the companion application) may receive a user input (e.g., selection of one or more displayed buttons) representing the device 110*c* is to be associated with the user 5's identifier. For example, the device 110*b* may receive such a user input in response to the user 5 acquiring (e.g., by purchase, gift, etc.) the device 110*c* and wanting to add the device 110*c* to a profile (e.g., a user profile or group profile stored by the system 120) corresponding to the user 5. The device 110*b* may send to the system 120, via the companion application, data representing the device 110*c*'s identifier and the user 5's desire to associate the device 110*c* with the user 5's identifier.

Devices 110 of different types may represent the same spoken word(s) (from the same user) differently based on different device types having different capabilities (e.g., different qualities of microphones, different echo cancelation functionalities, etc.). Thus, while the system 120 may store data (e.g., the first speaker recognition data) representing how the user 5 speaks the at least a first word to a first device type corresponding to the device 110*a*, the system 120 may not store data (e.g., audio data and/or speech characteristics) representing how the user 5 speaks the at least a first word to a second device type corresponding to the device 110*c*.

However, the system 120 may store (or otherwise have access to) speech characteristics representing how various individuals speak the at least a first word to a device 110 corresponding to the second device type. For example, the system 120 may store (or otherwise have access to) speech characteristics representing how various users of the system 120 speak the at least a first word to a device 110 corresponding to the second device type. For further example, the system 120 may store (or otherwise have access to) speech characteristics representing how various employees (of a corporate entity associated with the system 120) speak the at least a first word to a device 110 corresponding to the second device type. The system 120 may obtain prior authorization from individuals prior to storing (or otherwise having access to) such speech characteristics.

After the system 120 receives (144) the data representing the device 110*c*'s identifier and the user 5's desire to associate the device 110*c* with the user 5's identifier, the system 120 may determine (146) second speech characteristics representing how a plurality of individuals speak the at least a first word to a device 110 corresponding to the second device type. The system 120 may generate (148) a transform (e.g., a non-linear or other function) for converting between the first speech characteristics (used to generate the first speaker recognition data) and the second speech characteristics. In other words, the system 120 may generate a transform for converting between speech characteristics, representing the at least a first word as received by the first device type, and speech characteristics representing the at least a first word as received by the second device type.

The system 120 may apply (150) the transform to the first speaker recognition data to generate second speaker recognition data representing how the user 5 hypothetically speaks the at least a first word to the device 110*c*. Whereas the system 120 associates the first speaker recognition data with the user 5's identifier and the device 110*a*'s identifier, the system 120 may associate the second speaker recognition data with the user 5's identifier and an identifier of the device 110*c*. Such may enable the system 120 to (1) use the first speaker recognition data to attempt to recognize when the user 5 speaks a runtime spoken input to the device 110*a*, and (2) use the second speaker recognition data to attempt to recognize when the user 5 speaks a runtime spoken input to the device 110*c*.

As described above with respect to FIGS. 1-2, the system 120 may store speaker recognition data for use at runtime by the system 120. In at least some embodiments, a device 110 may be configured to perform speaker recognition functionality in addition to or instead of the system 120. To enable such, the system 120 may send the speaker recognition data to the device 110, and the device 110 may store the speaker recognition data for use at runtime by the device 110.

In at least some embodiments, the system 100 may be configured such that the system 120 does not determine speech characteristics and does not store speaker recognition data. In such embodiments, the system 120 may generate a transform and send the transform to the device 110 that is to perform speaker recognition processing, but the device 110 may perform the other processes (described above with respect to FIGS. 1-2) to generate the first and second speaker recognition data. It will be appreciated that such configuration of the system 100 enables speaker recognition data to be generated and executed by a device 110, and minimizes of negates the need for speaker recognition data to be generated and/or executed by the system 120. This may be beneficial for privacy reasons.

Figure 3:
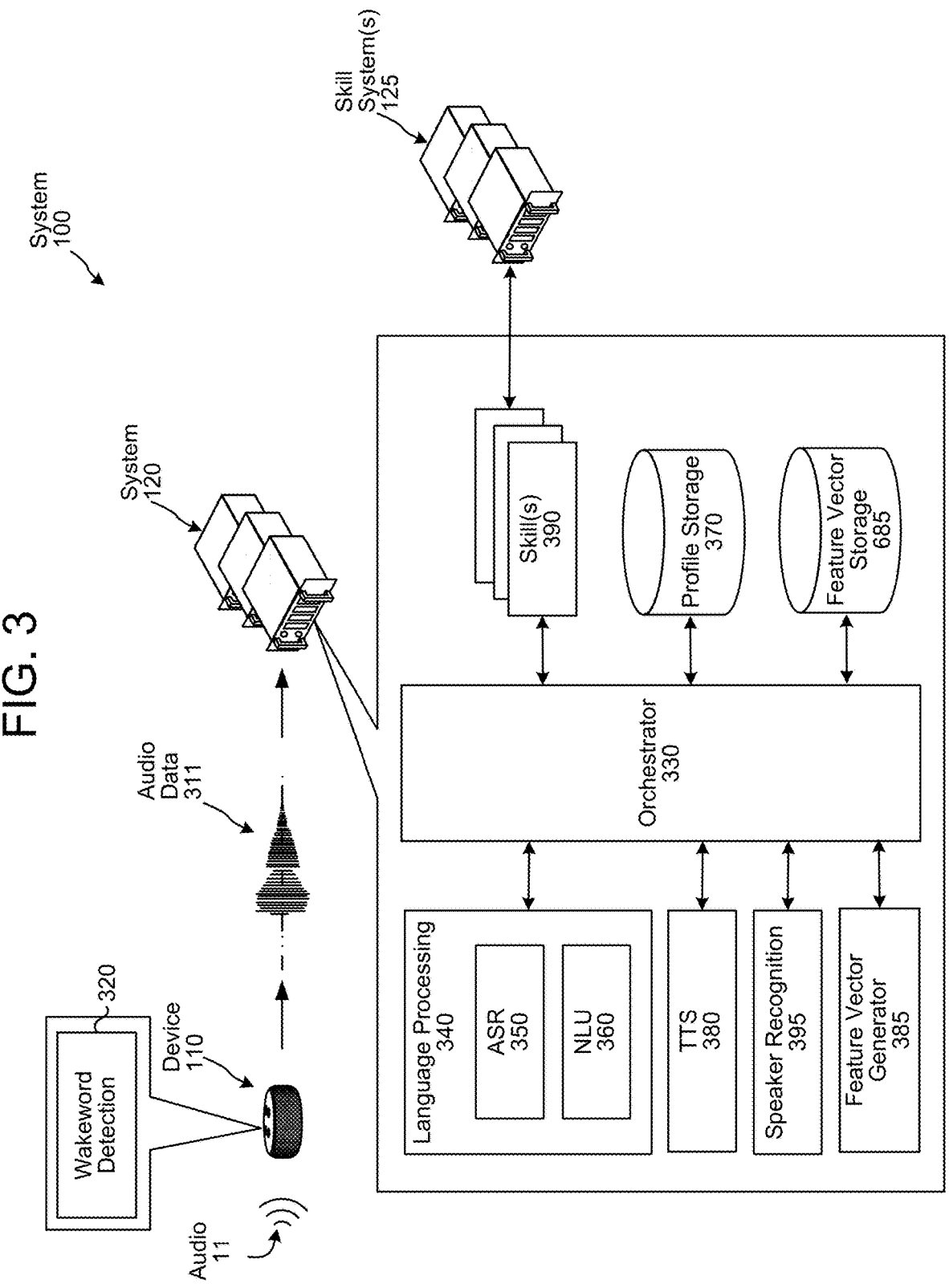
FIG. 3 is a conceptual diagram of components of a system, according to embodiments of the present disclosure.

The system 100 may operate using various components as illustrated in FIG. 3. The various components may be located on a same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented using techniques such as linear classifiers, support vector machines, decision trees, and deep neural networks (DNNs). In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the device 110 detects speech in audio data representing the audio 11, the device 110 may use a wakeword detection component 320 to perform to determine when the user 5 intends to speak an input to the device 110. The device 110 may be configured to detect various wakewords. In at least some examples, each wakeword may correspond to a different digital assistant. In at least some examples, a wakeword may correspond to a name of a digital assistant.

Example wakewords include, but are not limited to, "Alexa," "Echo," "Amazon," "Computer," and "Ask Sam" (a multi-word wakeword).

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 320 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 320 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 320 detects a wakeword, the device 110 may "wake" and begin transmitting audio data 311, representing the audio 11, to the system 120. The audio data 311 may include data corresponding to the detected wakeword, or the device 110a may remove the portion of the audio corresponding to the detected wakeword prior to sending the audio data 311 to the system 120.

The system 120 may include an orchestrator component 330 configured to receive the audio data 311 from the device 110. The system 120 may include a language processing component 340 configured to perform language processing. As used herein, language processing may refer to NLU processing, or a combination of ASR processing and NLU processing.

The orchestrator component 330 may send the audio data 311 to an ASR component 350 that transcribes the audio data 311 into ASR output data including one or more ASR hypotheses. ASR output data may include one or more textual interpretations (corresponding to one or more ASR hypotheses), or may be configured in another manner, such as a token. Each ASR hypothesis may represent a different likely interpretation of the speech in the audio data 311. Each ASR hypothesis may be associated with a score representing a confidence of ASR processing performed to generate the ASR hypothesis with which the score is associated.

The ASR component 350 interprets the speech in the audio data 311 based on a similarity between the audio data 311 and pre-established language models. For example, the ASR component 350 may compare the audio data 311 with models for sounds (e.g., subword units, such as phonemes, etc.) and sequences of sounds to identify words that match the sequence of sounds of the speech represented in the audio data 311.

Figure 4:
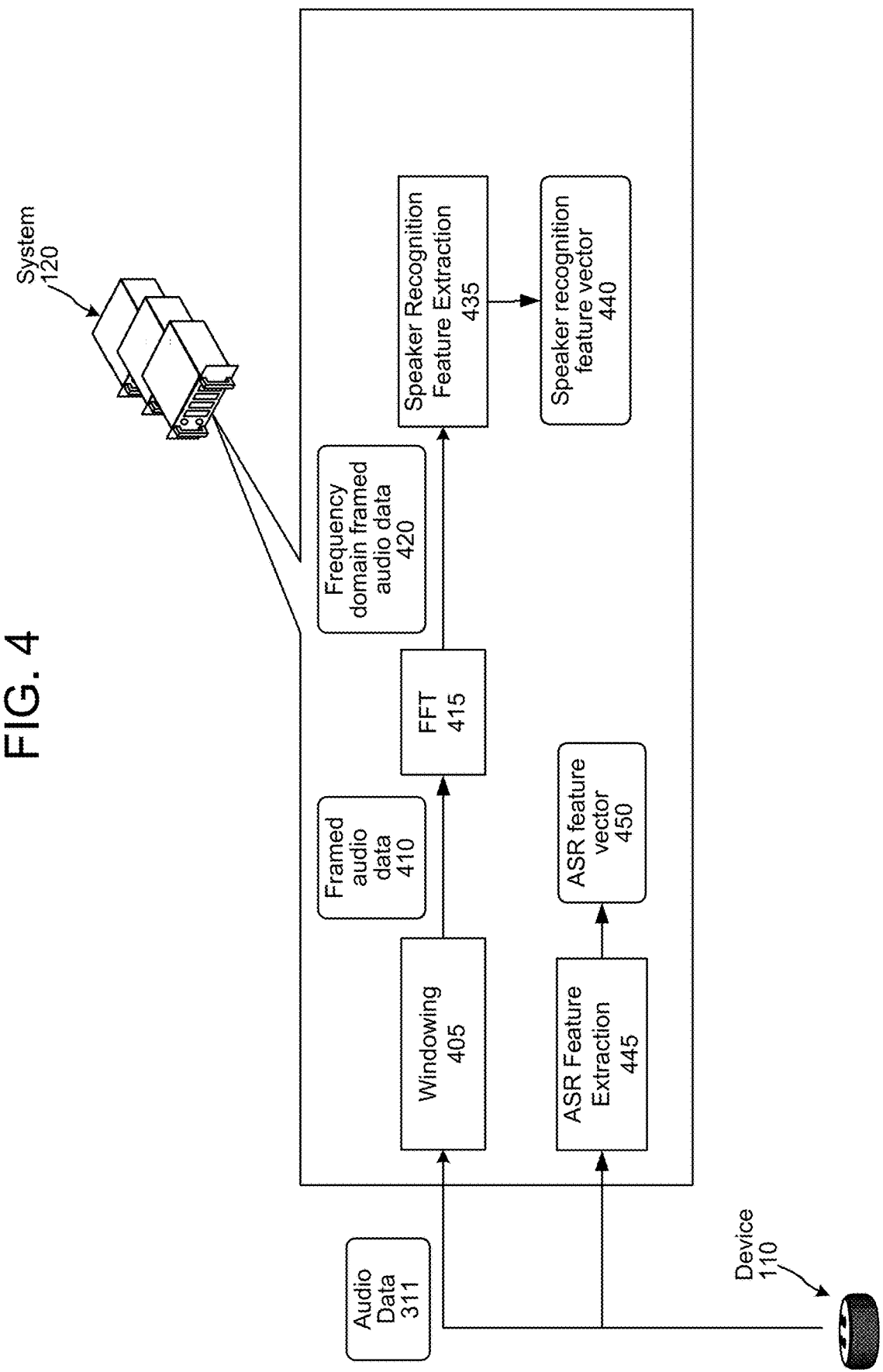
FIG. 4 is a conceptual diagram illustrating processing that may be performed to prepare audio data for ASR processing and speaker recognition processing, according to embodiments of the present disclosure.

FIG. 4 illustrates processing that may be performed by the system 120 to prepare the audio data 311 for ASR processing and speaker recognition processing. When the orchestrator component 330 receives the audio data 311 from the device 110, the orchestrator component 330 may send the audio data 311 to a windowing component 405 of the system 120.

The windowing component 405 may perform windowing functions on the audio data 311 to generate framed audio data 410 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. In at least some embodiments, the windowing component 405 may multiply a time record by a finite-length window with an amplitude that varies smoothly and gradually toward zero at its edges. By performing such, the endpoints of the waveforms of respective frames of audio data meet, resulting in a continuous waveform without sharp transitions.

The framed audio data 410, output by the windowing component 405, may be input to a fast Fourier transform (FFT) component 415 of the system 120. The FFT component 415 may convert the waveforms, in each frame of the framed audio data 410, from an original domain (e.g., a time domain) to a representation in a frequency domain, thereby creating frequency domain framed audio data 420.

The frequency domain framed audio data 420, output by the FFT component 415, may be input to an ASR feature extraction component 445. The ASR feature extraction component 445 may determine values (e.g., features) representing qualities of the frequency domain framed audio data 420, along with quantitating those features into values (e.g., feature vectors). The ASR feature extraction component 445 may determine ASR feature vector data 450 useful for ASR processing. The ASR feature extraction component 445 may use a number of approaches to extract features from the frequency domain framed audio data 420, such as MFCCs, PLP techniques, neural network feature vector techniques, linear discriminant analysis, semi-tied covariance matrices, or other approaches known to those skilled in the art.

The ASR feature vector data 450 may include a different feature vector for each audio frame. The ASR feature vector data 450 may be input to the ASR component 350.

The frequency domain framed audio data 420, output by the FFT component 415, may also be input to a speaker recognition feature extraction component 435. The speaker recognition feature extraction component 435 may perform frame level feature extraction and/or utterance level feature extraction. Frame level feature extraction may determine which frame of a universal background model (UBM) the frame corresponds to. The UBM may be a Gaussian mixture model, a deep neural network, etc. Utterance level feature extraction may analyze aligned speech frames to derive feature vectors of fixed length (illustrated as speaker recognition feature vector 440 in FIG. 4).

The speaker recognition feature extraction component 435 may determine values (i.e., features) representing qualities of the frequency domain framed audio data 420, along with quantitating those features into values (i.e., feature vectors). The speaker recognition feature extraction component 435 may determine speaker recognition feature vector data 440 useful for speaker recognition processing. The speaker recognition feature extraction component 435 may use a number of approaches to extract features from the frequency domain framed audio data 420, such as MFCCs, PLP techniques, neural network feature vector techniques, linear discriminant analysis, semi-tied covariance matrices, or other approaches known to those skilled in the art. The ASR feature vector data 450 and the speaker recognition feature vector data 440 may be the same feature vectors, different feature vectors, or may include some overlapping features.

In at least some embodiments, the speaker recognition feature extraction component 435 may output multiple speaker recognition feature vectors, for example one such vector for each audio frame. In at least some embodiments, the speaker recognition feature extraction component 435 may continue to receive the frequency domain framed audio data 420 while a spoken input is ongoing (e.g., before an endpoint of the spoken input is reached in the audio data 311). While the frequency domain framed audio data 420 is input to the speaker recognition feature extraction component 435, the speaker recognition feature extraction component 435 may accumulate or otherwise combine the frequency domain framed audio data 420 as it is received. That is, for a certain frame's worth of frequency domain framed audio data 420 that is receive, the speaker recognition feature extraction component 435 may combine that frame's worth of data to the previous data received for the particular spoken input. The particular method of accumulation may vary, including using an arithmetic component, a recurrent neural network (RNN), trained model, or other component capable of combining audio data. Further, the form of combination performed by the speaker recognition feature extraction component 435 may depend on what audio qualities are determined to be important for speaker recognition processing. Thus, the speaker recognition feature extraction component 435 may be trained to isolate and process data that is most useful for speaker recognition processing. The output of the speaker recognition feature extraction component 435 may thus include a speaker recognition feature vector 440 that includes values for features useful for speaker recognition processing.

Figure 5:
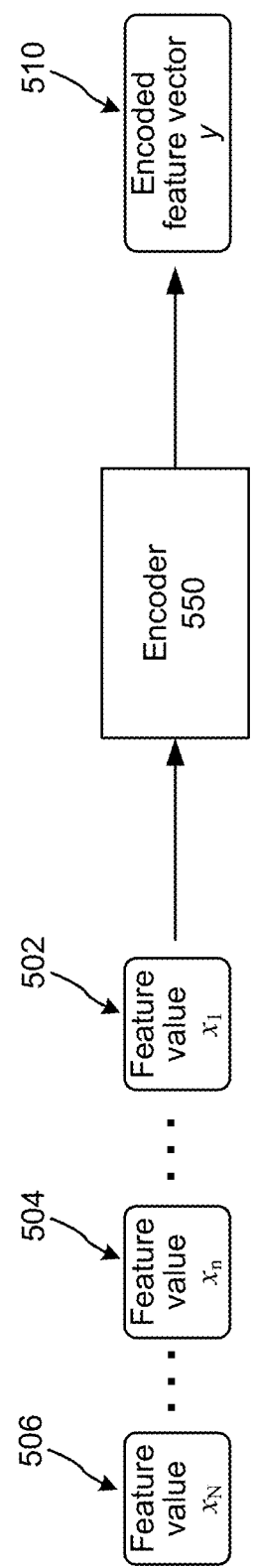
FIG. 5 is a conceptual diagram of a vector encoder, according to embodiments of the present disclosure.

The speaker recognition feature vector 440 may include multiple features, with each feature corresponding to a different portion of the spoken input. Alternatively, the speaker recognition feature vector 440 may be a single vector representing audio qualities of the spoken input. Referring to FIG. 5, a single speaker recognition feature vector 440 may be created using an encoder 550, which can create a fixed-size vector to represent certain characteristics of the spoken input. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence toy, with y being a F-dimensional vector. F is a fixed length of the vector and is configurable depending on use of the encoded vector and other system configurations. As illustrated in FIG. 5, feature values 502 through 506 (which may include feature vectors of the audio data 311, the frequency domain framed audio data 420, or the like) may be input into the encoder 550, which will output an encoded feature vector 510 that represents the input feature values. The individual feature values (e.g., 502 through 506) may correspond to specific audio frames. Regardless of how many feature values are input, any particular encoder 550 will be configured to output vectors of the same size, thus ensuring a continuity of output encoded vector size from any particular encoder 550 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 550 may be implemented as a neural network (NN), recurrent neural network (RNN), GMM, or other model. One particular example is a long short-term memory (LSTM) RNN. There are a variety of ways for the encoder 550 to consume data input therein, including but not limited to linear, one direction (forward or backward); bi-linear, essentially the concatenation of a forward and a backward embedding; or tree, based on parse-tree of the sequence. In addition, an attention model can be used, which is another RNN or deep neural network (DNN) that learns to "attract" attention to certain parts of the input. The attention model can be used in combination with the above methods of consuming the input.

FIG. 5 illustrates operation of the encoder 550. The input feature value sequence, starting with feature value $x_1$ 502, continuing through feature value $x_n$ 504, and concluding with feature value $x_N$ 506 is input into the encoder 550. The encoder 550 may process the input feature values as noted above. The encoder 550 outputs the encoded feature vectory 510, which is a fixed length feature vector of length F. Thus, the speaker recognition feature extraction component 435 may include an encoder 550 that receives audio feature values for a particular spoken input, and outputs a fixed length encoded feature vectory 510, which may be the speaker recognition feature vector 440. Thus, in at least some embodiments, no matter how long the spoken input is, or how many acoustic frames worth of feature values are input into the encoder 550, the output speaker recognition feature vector 440 will be of the same length, thus allowing for more ease of performing speaker recognition processing by the speaker recognition component 395. To allow for robust system operation, the speaker recognition feature vector 440 may include many dimensions (e.g., several hundred), thus providing many datapoints for downstream consideration.

Figure 6:
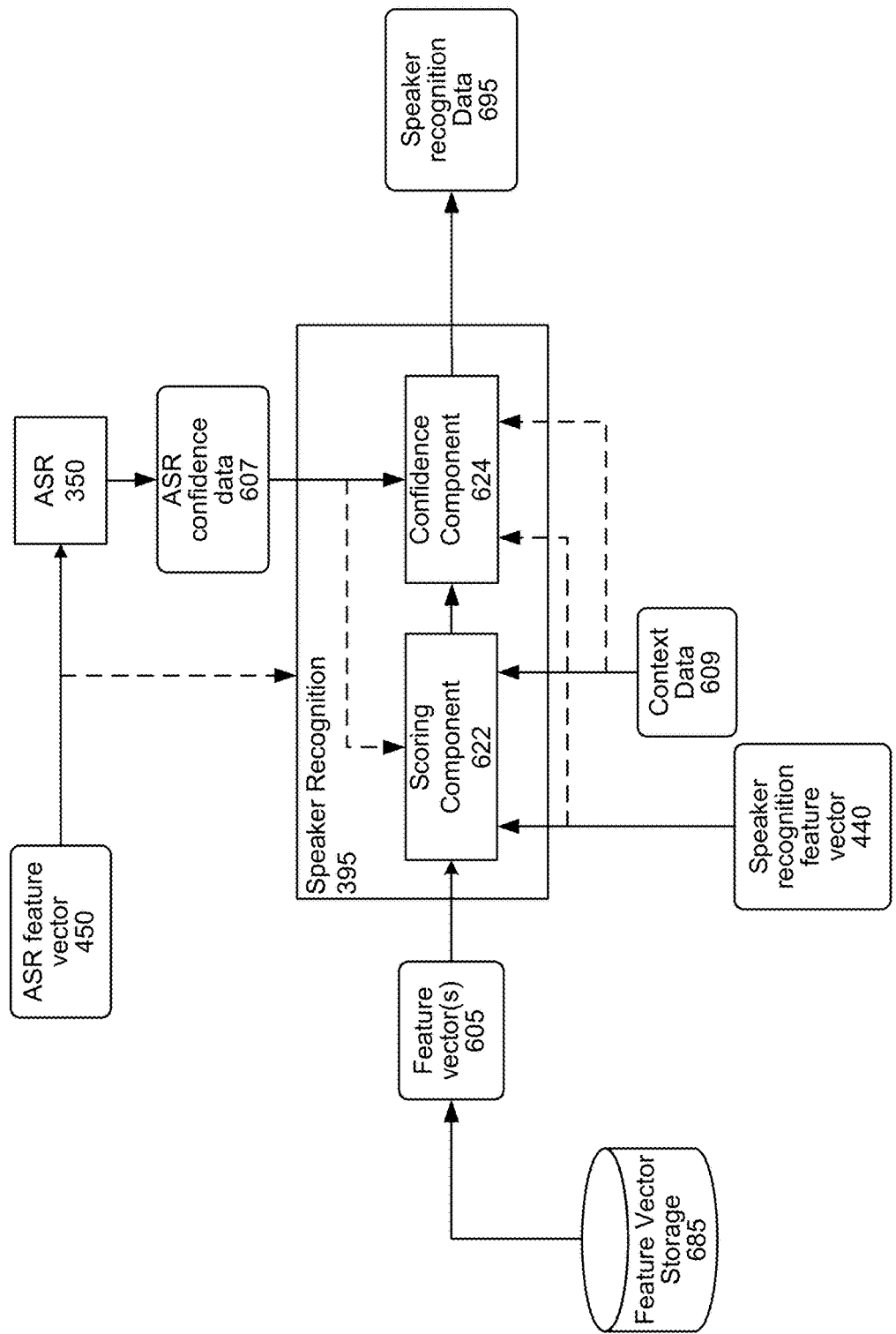
FIG. 6 is a conceptual diagram illustrating speaker recognition processing, according to embodiments of the present disclosure.

FIG. 6 illustrates speaker recognition processing as it may be performed by the speaker recognition component 395. The speaker recognition component 395 may receive ASR confidence data 607 output from the ASR component 350.

The speaker recognition component 395 performs speaker recognition using various data including the speaker recognition feature vector 440, one or more feature vectors 605 (e.g., the first and second speaker recognition data described with respect to FIGS. 1-2), the ASR confidence data 607, and context data 609. The speaker recognition component 395 may output speaker recognition data 695 that reflects a certain confidence that the spoken input was spoken by one or more particular users. The speaker recognition data 695 may include one or more user identifiers (e.g., each corresponding to a different user's stored feature vector). Each user identifier, in the speaker recognition data 695, may be associated with a respective confidence value, representing a likelihood that the spoken input corresponds to the user identifier. A confidence value may be a numeric or binned value.

The feature vector(s) 605, input to the speaker recognition component 395 may correspond to one or more feature vectors associated with a device identifier corresponding to the device 110 that received the spoken input presently being processed. The speaker recognition component 395 may use the feature vector(s) 605 to compare against the speaker recognition feature vector 440, representing the present spoken input, to determine whether the speaker recognition feature vector 440 corresponds to one or more of the feature vectors 605.

Each feature vector 605 may be the same size as the speaker recognition feature vector 440. For example, if the speaker recognition feature vector 404 is of size F (for example encoded by the encoder 550), a feature vector 605 may also be of size F.

To perform speaker recognition processing, the speaker recognition component 395 may determine the device 110 from which the audio data 311 originated. For example, the audio data 311 may be associated with metadata including a device identifier representing the device 110.

Either the device 110 or the system 120 may generate the metadata. The system 120 may determine a group profile identifier associated with the device identifier, may determine user identifiers associated with the group profile identifier, and may include the group profile identifier and/or the user identifiers in the metadata. The system 120 may associate the metadata with the speaker recognition feature vector 440 produced from the audio data 311. In at least some embodiments, the metadata may be sent to the speaker recognition component 395 as context data 609.

The speaker recognition component 395 may query a feature vector storage 685 for feature vectors 605 associated with the device identifier, the group profile identifier, and/or the user identifiers represented in the metadata (e.g., represented in the context data 609). This limits the universe of possible feature vectors 605 the speaker recognition component 395 considers at runtime and thus decreases the amount of time to perform speaker recognition processing by decreasing the amount of feature vectors 605 needed to be processed. Alternatively, the speaker recognition component 395 may access all (or some other subset of) the feature vectors 605 available to the speaker recognition component 695 (e.g., stored in the feature vector storage 685). However, accessing all feature vectors 605 will likely increase the amount of time needed to perform speaker recognition processing based on the magnitude of feature vectors 605 to be processed.

The speaker recognition component 395 may attempt to identify the user that spoke the speech represented in the audio data 311 by comparing the speaker recognition feature vector 440 to the feature vector(s) 605. The speaker recognition component 395 may include a scoring component 622 that determines respective scores indicating whether the spoken input (represented by the speaker recognition feature vector 440) was spoken by one or more particular users (represented by the feature vector(s) 605). The speaker recognition component 395 may also include a confidence component 624 that determines an overall accuracy of speaker recognition processing (such as those of the scoring component 622) and/or an individual confidence value with respect to each user potentially identified by the scoring component 622. The output from the scoring component 622 may include a different confidence value for each received feature vector 605. Although illustrated as two separate components, the scoring component 622 and the confidence component 624 may be combined into a single component or may be separated into more than two components.

The scoring component 622 and the confidence component 624 may implement one or more trained machine learning models (such neural networks, classifiers, etc.) as known in the art. For example, the scoring component 622 may use probabilistic linear discriminant analysis (PLDA) techniques. PLDA scoring determines how likely it is that the speaker recognition feature vector 440 corresponds to a particular feature vector 605. The PLDA scoring may generate a confidence value for each feature vector 605 considered and may output a list of confidence values associated with respective user identifiers. The scoring component 622 may additionally or alternatively use other techniques, such as GMMs, generative Bayesian models, or the like, to determine confidence values.

The confidence component 624 may receive various data including the ASR confidence data 607, speech length (e.g., number of frames or other measured length of the spoken input), audio condition/quality data (such as signal-to-interference data or other metric data), fingerprint data, image data, or other factors to consider how confident the speaker recognition component 395 is with regard to the confidence values linking users to the spoken input. The confidence component 624 may also consider the confidence values and associated identifiers output by the scoring component 622. For example, the confidence component 624 may determine that a lower ASR confidence (represented in the ASR confidence data 607), or poor audio quality, or other factors, may result in a lower confidence of the speaker recognition component 395. Whereas a higher ASR confidence (represented in the ASR confidence data 607), or better audio quality, or other factors, may result in a higher confidence of the speaker recognition component 395. Precise determination of the confidence may depend on configuration and training of the confidence component 624 and the model(s) implemented thereby. The confidence component 624 may operate using a number of different machine learning models/techniques such as GMM, neural networks, etc. For example, the confidence component 624 may be a classifier configured to map a score output by the scoring component 622 to a confidence value.

The speaker recognition component 395 may output speaker recognition data 695 specific to one or more user identifier. For example, the speaker recognition data 695 may include each user identifier associated with a received feature vector 605 input to the speaker recognition component 395. The speaker recognition data 695 may include numeric confidence values (e.g., 0.0-1.0, 0-1000, or whatever scale the system is configured to operate). Thus the speaker recognition data 695 may include an N-best list of user identifiers associated with respective numeric confidence values (e.g., user identifier 123—0.2, user identifier 234—0.8). Additionally or alternatively, the speaker recognition data 695 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus the speaker recognition data 695 may include an N-best list user identifiers associated with respective binned confidence values (e.g., user identifier 123—low, user identifier 234—high). Combined binned and numeric confidence value outputs are also possible. Rather than a list of user identifiers and their respective confidence values, the speaker recognition data 695 may only include information related to the top scoring user identifier as determined by the speaker recognition component 395. The speaker recognition component 395 may also output an overall confidence value that the individual confidence values are correct, where the overall confidence value indicates how confident the speaker recognition component 395 is in the speaker recognition data 695.

The confidence component 624 may determine differences between individual confidence values when determining the speaker recognition data 695. For example, if a difference between a first confidence value and a second confidence value is large, and the first confidence value is above a threshold confidence value, then the speaker recognition component 395 is able to recognize a first user (associated with the feature vector 605 associated with the first confidence value) as the user that spoke the spoken input with a much higher confidence than if the difference between the confidence values were smaller.

The speaker recognition component 395 may perform thresholding to avoid incorrect speaker recognition data 695 being output. For example, the speaker recognition component 395 may compare a confidence value, output by the confidence component 624, to a threshold confidence value. If the confidence value does not satisfy (e.g., does not meet or exceed) the threshold confidence value, the speaker recognition component 395 may not output speaker recognition data 695, or may only include in that data 695 an indicator that a user could not be recognized.

The speaker recognition component 395 may be defaulted to output binned (e.g., low, medium, high) speaker recognition confidence values. However, such may be problematic in certain situations. For example, if the speaker recognition component 395 computes a single binned confidence value for multiple feature vectors 605, the system may not be able to effectively determine which user originated the spoken input. In this situation, the speaker recognition component 395 may be configured to override its default setting and output numeric confidence values. This enables the system to determine a user, associated with the highest numeric confidence value, originated the spoken input.

The speaker recognition component 395 may consider context data 609 to inform speaker recognition processing. A trained model(s) or other component of the speaker recognition component 395 may be trained to take context data 609 as an input feature when performing speaker recognition processing. Context data 609 may include a variety of data types depending on system configuration and may be made available from other sensors, devices, or storage. The context data 609 may include a time of day when the audio data 311 was generated by or received from the device 110, a day of a week when the audio data 311 was generated by or received from the device 110, etc.

The context data 609 may include image data or video data. For example, facial recognition may be performed on image data or video data received from the device 110 from which the audio data 311 was received (or another device). Facial recognition may be performed by the speaker recognition component 395, or another component of the system 120. The output of facial recognition processing may be used by the speaker recognition component 395. That is, facial recognition output data may be used in conjunction with the comparison of the speaker recognition feature vector 440 and one or more feature vectors 605 to perform more accurate speaker recognition processing.

The context data 609 may include location data representing a location (e.g., a geographic location, a particular location within a building, etc.) of the device 110. The location data may represent a geographic location (e.g., country, state, town, etc.) where the device 110 is located. The location data may additionally or alternatively represent a specific location within a building. For example, if the device 110 is located in user A's bedroom, such location may increase a speaker recognition confidence value associated with user A and/or decrease a speaker recognition confidence value associated with user B.

The context data 609 may indicate a type of the device 110. Different types of devices may include, for example, a smart watch, a smart phone, a tablet computer, and a vehicle. The type of the device 110 may be indicated in a profile associated with the device 110. For example, if the device 110, from which the audio data 311 was received, is a smart watch or vehicle belonging to a user A, the fact that the device 110 belongs to user A may increase a speaker recognition confidence value associated with user A and/or decrease a speaker recognition confidence value associated with user B.

The context data 609 may include global positioning system (GPS) information associated with the device 110. For example, a group profile associated with a vehicle may indicate multiple users (e.g., user A and user B). The vehicle may include a GPS indicating latitude and longitude coordinates of the vehicle when the audio data 311 is generated by the vehicle. As such, if the vehicle is located at a coordinate corresponding to a location (e.g., work, home, school, etc.) associated with user A, such may increase a speaker recognition confidence value associated with user A and/or decrease speaker recognition confidence values of all other users indicated in a group profile associated with the vehicle. Global coordinates and associated locations (e.g., work, home, etc.) may be indicated in a profile associated with the device 110. The global coordinates and associated locations may also or alternatively be associated with one or more user profiles.

The context data 609 may indicate activity of a particular user that may be useful in performing speaker recognition processing. For example, if a user has recently entered a code to disable a home security alarm, and the audio data 311 was received from a device 110 represented in a group profile associated with the home, signals from the home security alarm about the disabling user, time of disabling, etc. may be reflected in the context data 609 and considered by the speaker recognition component 395. If a mobile device (such as a smart phone, Tile, dongle, or other device) known to be associated with a particular user is detected proximate to (for example physically close to, connected to the same WiFi network as, or otherwise nearby) the device 110, this may be reflected in the context data 609 and considered by the speaker recognition component 395.

Various machine learning techniques may be used to train and operate models to perform various processes described herein, such as speaker recognition feature extraction, encoding, speaker recognition scoring, speaker recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The speaker recognition data 695 may be used to influence processes performed by various components of the system 100.

Referring again to FIG. 3, the ASR output data (output by the ASR component 350), and optionally the user recognition data 695, may be input to a NLU component 360. The NLU component 360 attempts to make a semantic interpretation of the phrase(s) or statement(s) represented in the ASR output data. That is, the NLU component 360 determines one or more meanings associated with the phrase(s) or statement(s) represented in the ASR output data based on words represented in the ASR output data. The NLU component 360 determines an intent representing an action that a user desires be performed as well as pieces of the spoken input that allow the device 110 (or other device), the system 120, a skill system 125, etc. to execute the intent. For example, if the ASR output data corresponds to "play Adele music," the NLU component 360 may determine a <PlayMusic> intent and may identify "Adele" as an artist. For further example, if the ASR output data corresponds to "what is the weather," the NLU component 360 may determine an <OutputWeather> intent. In another example, if the ASR output data corresponds to "turn off the lights," the NLU component 360 may determine a <DeactivateLight> intent. The NLU component 360 may output NLU output data (which may include one or more intent indicators that are each associated with one or more portions of tagged text data).

As described above, the system 120 may implement the language processing component 340 as two different components (i.e., the ASR component 350 and the NLU component 360). In at least some embodiments, the language processing component 340 may be implemented as a single component equivalent to a combination of the ASR component 350 and the NLU component 360. In such embodiments, the language processing component 340 may process the audio data 311 and directly generate NLU output data, without an intermediate step of generating ASR output data. As such, the language processing component 340 may take audio data 311 representing speech and attempt to make a semantic interpretation of the speech.

The system 120 may include one or more skill components 390. A skill component 390 may be software running on the system 120 that is akin to a software application running on a traditional computing device. That is, a skill component 390 may enable the system 120 to execute user commands involving specific functionality in order to provide data or produce some other requested output. A skill component 390 may operate in conjunction between the system 120 and other devices, such as the device 110, in order to complete certain functions. Inputs to a skill component 390 may come from speech processing interactions or through other interactions or input sources. A skill component 390 may include hardware, software, firmware, or the like that may be dedicated to a particular skill component 390 or shared among different skill components.

A skill component 390 may be configured to execute with respect to NLU output data. For example, for NLU output data including a <GetWeather> intent, the system 120 (and more particularly the orchestrator component 330) may invoke a weather skill component to determine and output weather information for a geographic location represented in a user profile or corresponding to a location of the device 110 that captured the spoken input. For further example, for NLU output data including a <BookRide> intent, the system 120 (and more particularly the orchestrator component 330) may invoke a taxi skill component may book a requested ride. In another example, for NLU output data including a <BuyPizza> intent, the system 120 (and more particularly the orchestrator component 330) may invoke a restaurant skill component to place an order for a pizza. A skill component 390 may operate in conjunction between the system 120 and other devices, such as the device 110, restaurant electronic ordering systems, taxi electronic booking systems, etc. in order to complete certain functions.

A skill component 390 may be associated with a domain, a non-limiting list of which includes a smart home domain, a music domain, a video domain, a weather domain, a communications domain, a flash briefing domain, a shopping domain, and a custom domain.

The functionality described herein as a skill component 390 may be referred to using many different terms, such as an action, bot, app, application, or the like.

In at least some embodiments, a skill component 390 may perform an action by interacting with a skill system 125, which may include one or more databases, other software, and/or the like. For example, a skill component 390 may send an instruction to a skill system 125 to execute specific functionality in order to provide data or perform some other action requested by the user 5. In some examples, a skill component 390 may send a request for data (e.g., request for information) to a skill system 125 and may receive the requested data from the skill system 125, enabling the skill component 390 to perform an action requested by the user 5. In other examples, a skill component 390 may send an instruction to the skill system 125 and the skill system 125 may perform the action requested by the user 5. For example, a weather skill system may enable the system 100 to provide weather information, a car service skill system may enable the system 100 to book a trip with respect to a taxi or ride sharing service, a restaurant skill system may enable the system 100 to order a pizza with respect to the restaurant's online ordering system, etc.

The system 120 may communicate with a skill system 125 via Hypertext Transfer Protocol (HTTP) or HTTPS over one or more computer networks such as the network(s) 199, although the disclosure is not limited thereto. Communication between the system 120 and a skill system 125 may occur over one or more third-party network; that is, a computer network maintained by a provider not associated with the system 120 or the skill system 125 other than by use of the third-party network.

Additionally or alternatively, a skill component 390 may be implemented by a device 110. This may enable the device 110 to execute specific functionality in order to provide data or perform some other action requested by the user 5. The device 110 can host a skill component 390 in the form of an application executing on the device 110. Such a device 110 can be, for example, a mobile device 110 on a mobile network or a local area network (LAN).

The system 120, skill system 125, and/or device 110 may each host or otherwise execute instances of same or different skills. In some cases, a single skill—for example, a music skill—may have instances executing on more than one of the system 120, skill system 125, and/or device 110. For example, a skill system 125 may host a default instance of a skill while a device 110 hosts a personal instance of the skill. The personal instance of the skill may be a skill instance under development or test on a machine local to and/or operated by a skill developer. In another example, the system 120 may host a default instance of a skill while the device 110 hosts a personal instance of the skill in the form of an application executing on the device 110.

The system 120 may include a TTS component 380 that generates audio data (e.g., synthesized speech) from text data using one or more different methods. Text data input to the TTS component 380 may come from a skill component 390, a skill system 125, the orchestrator component 330, or another component of the system 120.

In one method of synthesis called unit selection, the TTS component 380 matches text data against a database of recorded speech. The TTS component 380 selects matching units of recorded speech and concatenates the units together to form audio data. In another method of synthesis called parametric synthesis, the TTS component 380 varies parameters such as frequency, volume, and noise to generate audio data including an artificial speech waveform. Parametric synthesis uses a computerized voice generator, sometimes called a vocoder.

The system 120 may include profile storage 370. The profile storage 370 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to spoken inputs corresponding to the profile.

The profile storage 370 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skill components 390/skill systems 125 that the user has enabled. When a user enables a skill component 390/skill system 125, the user is providing the system 120 with permission to allow the skill component 390/skill system 125 to execute with respect to the user's spoken inputs. If a user does not enable a skill component 390/skill system 125, the system 120 may not invoke the skill component 390/skill system 125 to execute with respect to the user's spoken inputs.

The profile storage 370 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 370 may include one or more device profiles. Each device profile may be associated with a different device identifier. A device profile may include various device identifying data (such as input/output capabilities). A device profile may also include one or more user identifiers, corresponding to one or more user profiles associated with the device profile. For example, a household device's profile may include the user identifiers of users of the household.

Figure 7:
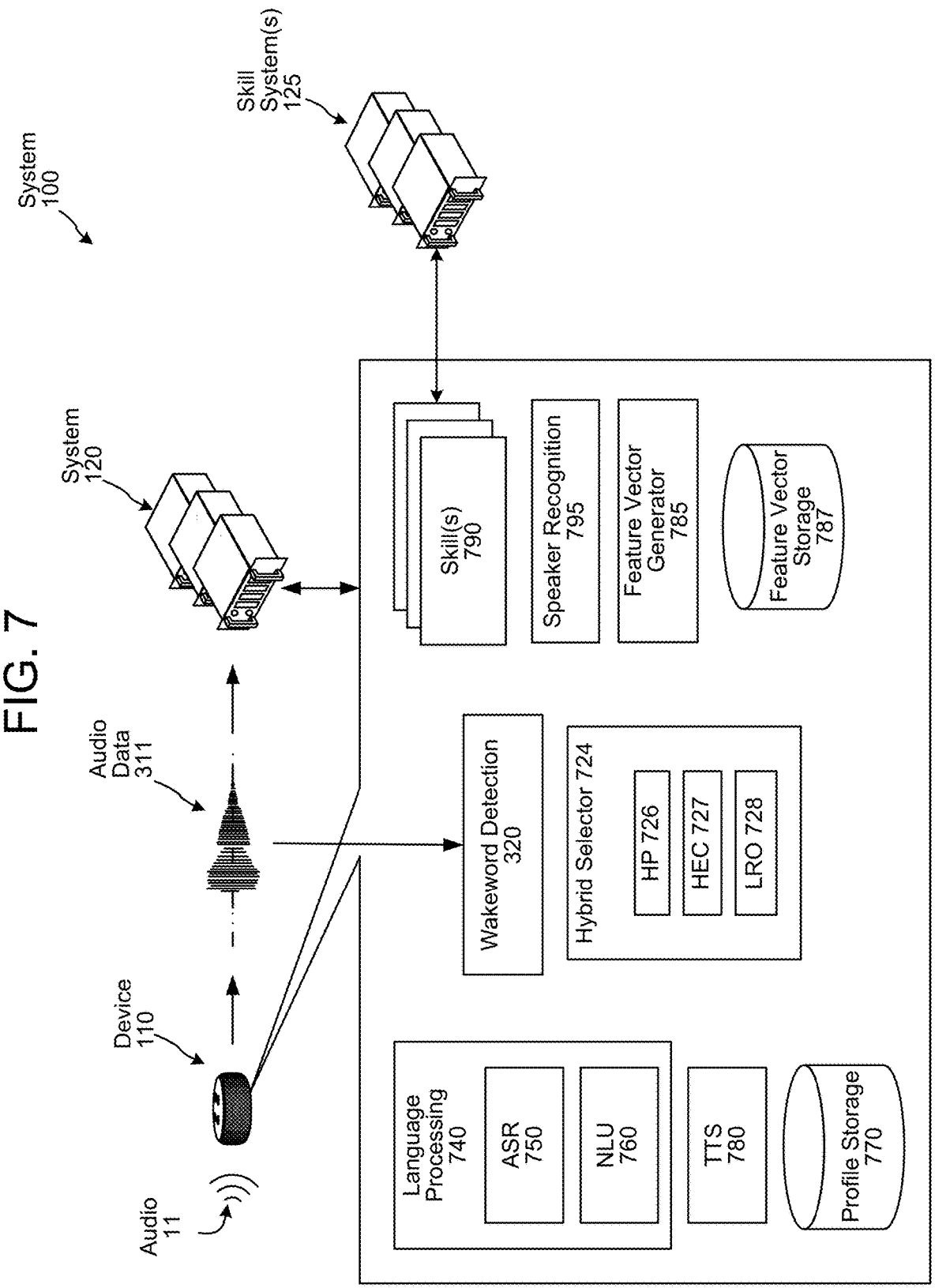
FIG. 7 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing of the system 120 described above. FIG. 7 illustrates the system 100 as it may be configured to include a device 110 capable of performing speech processing and speaker recognition processing. Optimizing the utilization of on-device computing resources (e.g., processing resources, etc.) of the device 110, in at least some situations, can reduce latency so that the user experience with the device 110 is not negatively impacted by local processing tasks taking too long.

The device 110 may include a language processing component 740. While FIG. 7 illustrates the language processing component 740 as including an ASR component 750 and/or an NLU component 760, the disclosure is not limited thereto. For example, the language processing component 740 may include a SLU component without departing from the disclosure. For example, the SLU component may be configured to receive audio data as an input and generate NLU data as an output, similar to the combination of the ASR component 750 and the NLU component 760.

In general, the device 110 may be capable of capturing utterances with a microphone(s) and responding in various ways, such as by outputting content (e.g., audio) via an output device(s), which may be loudspeaker(s), a display(s), or any other suitable output component. In addition, the device 110 may be configured to respond to user speech by controlling one or more other devices that are co-located in an environment with the device 110, such as by sending a command to a second device via an input/output communications interface (e.g., a short range radio), the command instructing an operation to be performed at the second device (e.g., to turn on/off a smart light in the environment).

In addition to using a built-in microphone(s) to capture spoken inputs and convert them into digital audio data, a first device 110a may additionally or alternatively receive audio data from a second device 110b in the environment, such as when the second device 110b captures a spoken input from the user 5 and sends the audio data to the first device 110a. This may occur in situations where the second device 110b is closer to the user 5 and would like to leverage the processing capabilities of the first device 110a.

The device 110 may operate in conjunction with and/or under the control of a remote, network-based or network-accessible control system (e.g., the system 120). The system 120 may, in some examples be part of a network-accessible computing platform that is maintained and accessible via one or more network(s) 199 such as a wide area network. Network-accessible computing platforms such as this may be referred to using terms such as "on-demand computing", "software as a service (SaaS)", "platform computing", "network-accessible platform", "cloud services", "data centers", and so forth. The system 120 may be configured to provide particular functionality to large numbers of local (e.g., in-home, in-car, etc.) devices 110 of different users. The network(s) 199 is representative of any type of public or private, wide-area network, such as the Internet, which extends beyond the environment of the device 110. Thus, the wide area network may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies. In contrast, the device 110 and other local devices (located in the same environment as the device 110) may be connected to a private network associated with the environment (e.g., home, business, etc.), and the devices may communicate with the network(s) 199 via the private network.

In at least some embodiments, the system 120 may be configured to receive the audio data 311 from the device 110, to recognize speech corresponding to a spoken input in the received audio data 311 using a language processing component 340 (which may be referred to as a remote speech processing system), and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 780) to the user 5's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 3, the device 110 may include a wakeword detection component XA20 configured to compare the audio data 311 to stored models used to detect a wakeword (e.g., "Alexa," "Computer," "Echo," "Amazon," "Ask Sam," or the like) that indicates to the device 110 that the audio data 311 is to be processed for determining a NLU result (e.g., slot data that corresponds to a named entity, label data, and/or intent data, etc.). In at least some embodiments, a hybrid selector 724, of the device 110, may send the audio data 311 to the wakeword detection component 320. If the wakeword detection component 320 detects a wakeword in the audio data 311, the wakeword detection component 320 may send an indication of such detection to the hybrid selector 724. In response to receiving the indication, the hybrid selector 724 may send the audio data 311 to the system 120 and/or the local language processing component 740 (in which case the system 120 and the local language processing component 740 may process the audio data 311 in parallel, or at least partially in parallel, although the disclosure is not limited thereto). The wakeword detection component 320 may also send an indication, to the hybrid selector 724, representing a wakeword was not detected. In response to receiving such an indication, the hybrid selector 724 may refrain from sending the audio data 311 to the system 120, and may prevent the local language processing component 740 from further processing the audio data 311. In this situation, the audio data 311 can be discarded.

The device 110 may conduct its own speech processing using on-device language processing components, such as an ASR component 750 and an NLU component 760, similar to the manner discussed above with respect to the ASR component 350 and the NLU component 760 of the system 120. The device 110 may also internally include, or otherwise have access to, other components such as one or more skill components 790 capable of executing commands based on NLU results or other results determined by the device 110, a speaker recognition component 795 (configured to process in a similar manner to that discussed above with respect to the speaker recognition component 395 of the system 120), profile storage 770 (configured to store similar profile data to that discussed above with respect to the profile storage 370 of the system 120), or other components. In at least some embodiments, the profile storage 770 may only store profile data for a user or group of users specifically associated with the device 110. Similar to as described above with respect to FIG. 3, a skill component 790 may communicate with a skill system(s) 125.

In at least some embodiments, the on-device language processing components may not have the same capabilities as the language processing components of the system 120. For example, the on-device language processing components may be configured to handle only a subset of the spoken inputs that may be handled by the system 120. For example, such subset of spoken inputs may corresponding to local-type spoken inputs, such as those controlling devices or components associated with a user's home. In such circumstances the on-device language processing components may be able to more quickly interpret and respond to a local-type spoken input, for example, than processing that involves the system 120. If the device 110 attempts to process a spoken input for which the on-device language processing components are not necessarily best suited, the language processing results generated by the device 110 may indicate a low confidence or other metric indicating that the processing by the device 110 may not be as accurate as the processing done by the system 120.

The hybrid selector 724, of the device 110, may include a hybrid proxy (HP) 726 configured to proxy traffic to/from the system 120. For example, the HP 726 may be configured to send messages to/from a hybrid execution controller (HEC) 727 of the hybrid selector 724. For example, command/directive data received from the system 120 can be sent to the HEC 727 using the HP 726. The HP 726 may also be configured to allow the audio data 311 to pass to the system 120 while also receiving (e.g., intercepting) this audio data 311 and sending the audio data 311 to the HEC 727.

In at least some embodiments, the hybrid selector 724 may further include a local request orchestrator (LRO) 728 configured to notify the local language processing component 740 about the availability of new audio data 311 that represents user speech, and to otherwise initiate the operations of the local language processing component 740 when new audio data 311 becomes available. In general, the hybrid selector 724 may control execution of the local language processing component 740, such as by sending "execute" and "terminate" events/instructions to the local language processing component 740. An "execute" event may instruct the local language processing component 740 to continue any suspended execution based on the audio data 311 (e.g., by instructing the local language processing component 740 to execute on a previously-determined intent in order to generate a directive). Meanwhile, a "terminate" event may instruct the local language processing component 740 to terminate further execution based on the audio data 311, such as when the device 110 receives directive data from the system 120 and chooses to use that remotely-generated directive data.

Thus, when the audio data 311 is received by the device 110, the HP 726 may allow the audio data 311 to pass through to the system 120 and the HP 726 may also input the audio data 311 to the on-device language processing component 741 by routing the audio data 311 through the HEC 727 of the hybrid selector 724, whereby the LRO 728 notifies the local language processing component 741 of the incoming audio data 311. At this point, the hybrid selector 724 may wait for response data from either or both of the system 120 or the local language processing component 740. However, the disclosure is not limited thereto, and in some examples the hybrid selector 724 may send the audio data 311 only to the local language processing component 741 without departing from the disclosure. For example, the device 110 may process the audio data 311 locally without sending the audio data 311 to the system 120.

The local language processing component 340 is configured to receive the audio data 311 from the hybrid selector 724, to recognize speech in the audio data 311, to determine a user intent from the recognized speech, and to determine how to act on the user intent by generating NLU output data which may include directive data (e.g., instructing a component to perform an action). Such NLU output data may take a form similar to that as determined by the NLU component 360 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the local language processing component 740 (and/or the system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated direcative. In other words, a device-generated directive may mimic a remotely-generated directive by using a same, or a similar, format as the remotely-generated directive.

The language processing component 740 may process the audio data 311 to determine local NLU output data, which may include intent data and/or slot data, so that directives may be determined based on the intent data and/or the slot data. Thus, the language processing component 740 may process the audio data 311 and attempt to make a semantic interpretation of the spoken input represented by the audio data 311 (e.g., determine a meaning associated with the spoken input) and then implement that meaning. For example, the language processing component 740 may interpret the spoken input, in the audio data 311, in order to derive an intent or a desired action or operation from the user 5. This may include deriving pertinent pieces of information from the spoken input that allow the language processing component 740 to identify a second device in the environment, if the user, for example, intends to control a second device (e.g., a light in the user 5's house). The local language processing component 740 may also provide a dialog management function to engage in speech dialogue with the user 5 to determine (e.g., clarify) intents by asking the user 5 for information using synthesized speech prompts.

In at least some embodiments, the language processing component 740 may output a single NLU hypothesis determined to most likely representing the spoken input in the audio data 311. Alternatively, in at least some embodiments, the language processing component 740 may output multiple NLU hypotheses in the form of a lattice or an N-best list, with individual NLU hypotheses corresponding to respective confidence values or other values (such as probability values, etc.). In at least some embodiments, the language processing component 740 may be customized to the user 5 (or multiple users) who created a user account to which the device 110 is registered. For example, the language processing component 740 may process the audio data 311 based on known information (e.g., preferences) of the user 5, and/or on a history of previous interactions with the user 5.

NLU output data, as determined by the device 110 and/or the system 120, may include confidence data representing a confidence and/or estimated accuracy of the NLU output data. Such confidence data may come in the form of a numeric score, but may also come in different forms such as an indicator of Low, Medium, or High, a ranking, or other data. The confidence data may be set to a similar scale so that confidence data for one set of NLU results (e.g., NLU output data generated by the device 110) may be evaluated with regard to confidence data for another set of results (e.g., NLU output data generated by the system 120).

Thus, an NLU hypothesis may be selected as usable to respond to the spoken input, and the local language processing component 740 may send local response data (e.g., local NLU output data and/or local directive data) to the hybrid selector 724, such as a "ReadyToExecute" response, which can indicate that the local language processing component 740 has recognized an intent, or is ready to communicate failure (e.g., if the local language processing component 740 could not recognize an intent). The hybrid selector 724 may then determine whether to use directive data from the local language processing component 740 to respond to the spoken input, to use directive data received from the system 120, assuming a remote response is even received (e.g., when the device 110 is able to access the system 120 over the network(s) 199), or to generate output audio requesting additional information from the user 5.

The device 110 and/or the system 120 may associate a unique identifier with each spoken input. The device 110 may include the unique identifier when sending the audio data 311 to the system 120, and the response data from the system 120 may include the unique identifier to identify which spoken input the response data corresponds.

In at least some embodiments, the device 110 may include, or be configured to use, one or more skill components 790 that may work similarly to the skill component(s) 390 implemented by the system 120. The skill component(s) 790 may correspond to one or more domains that are used in order to determine how to act on a spoken input in a particular way, such as by outputting a directive that corresponds to the determined intent, and which can be processed to implement the desired operation. Accordingly, the term "skill" may be used interchangeably with the terms "speechlet," "domain," or "domain implementation." The skill component(s) 790 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network [such as a local area network (LAN)].

In order to generate a particular interpreted response, the language processing component 740 may apply grammar models and lexical information associated with the respective skill component(s) 790 to recognize one or more entities in the spoken input. In this manner the language processing component 740 may identify "slots" (i.e., particular words in the spoken input) that may be needed for later command processing. Depending on the complexity of the language processing component 740, it may also label each slot with a type of varying levels of specificity (such as noun, place, city, artist name, song name, device name, or the like). Each grammar model used by the language processing component 740 may include the names of entities (i.e., nouns) commonly found in speech about the particular skill component 790 (i.e., generic terms), whereas the lexical information (e.g., from a gazetteer) is personalized to the user 5 and/or the device 110. For example, a grammar model associated with a navigation skill component may include a database of words commonly used when people discuss navigation.

Accordingly, the intents identified by the language processing component 740 may be linked to skill component-specific grammar frameworks with "slots" or "fields" to be filled (e.g., resolved). Each slot/field corresponds to a portion of the spoken input that the language processing component 740 believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the language processing component 740 may parse the spoken input to identify words as subject, object, verb, preposition, etc., based on grammar rules and/or models, prior to recognizing named entities. The identified verb may be used by the language processing component 740 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The language processing component 740 may then search the corresponding fields in the skill component-specific and personalized lexicon(s), attempting to match words and phrases in the spoken input tagged as a grammatical object or object modifier with those identified in the database(s).

Figure 8:
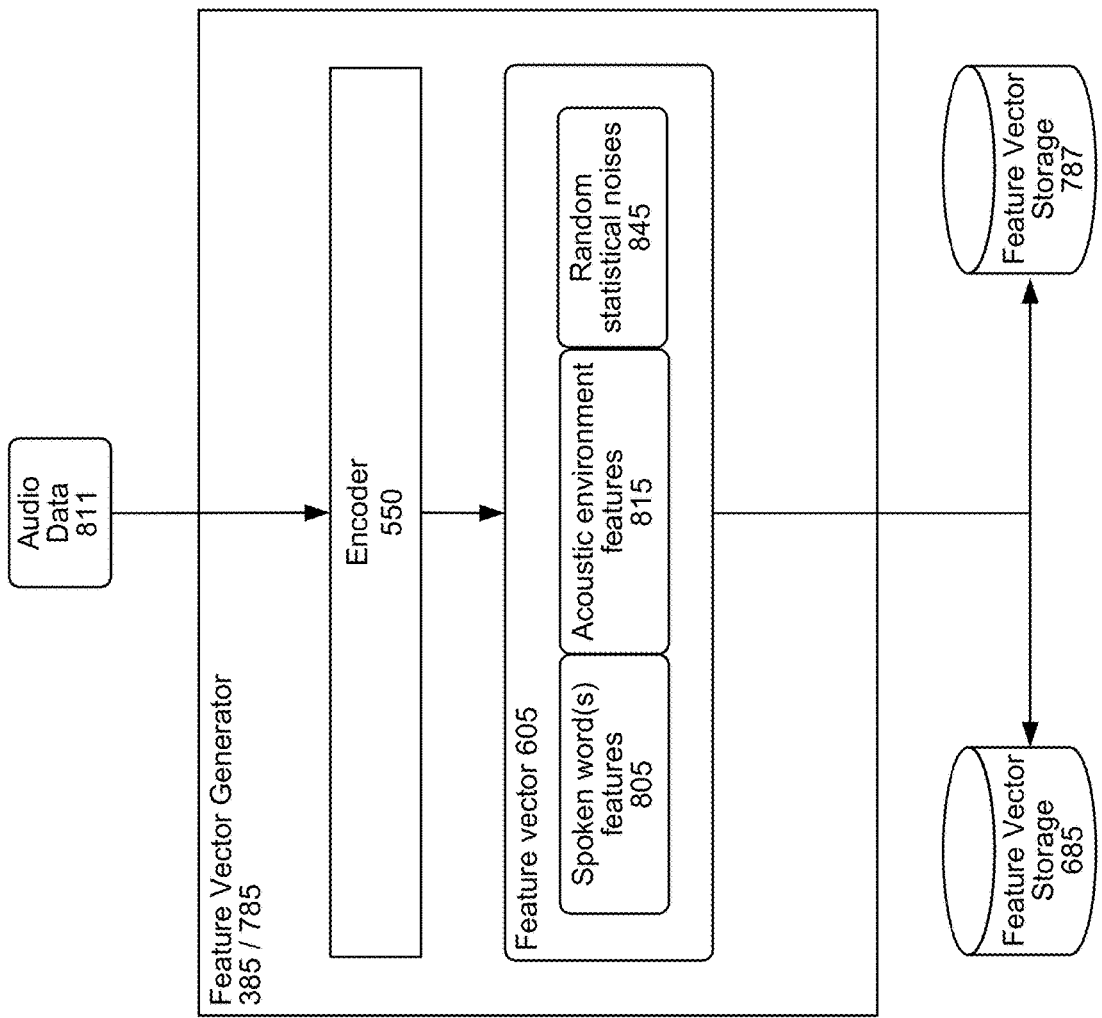
FIG. 8 is a conceptual diagram illustrating how a first speaker recognition feature vector may be generated for a user, according to embodiments of the present disclosure.

As described above, the user 5 may be prompted to provide one or more spoken inputs, including one or more words, when the user 5 wants to enroll in speaker recognition functionality provided by the system 120 and/or the device 110. FIG. 8 conceptually illustrates how a feature vector generator 385 of the system 120, and/or a feature vector generator 785 of the device 110, may generate a feature vector 605 for use at runtime.

The feature vector generator 385/785 may input audio data 811 (and more particularly frequency domain framed audio data as described with respect to FIG. 4) representing the spoken prompted word(s) to be used for speaker recognition processing, and potentially other words, into the encoder 550. The encoder 550 may process the audio data 811, as described herein above, to generate a feature vector 605.

The feature vector 605 may include various features. For example, the feature vector 605 may include spoken word(s) features 805 representing how the user 5 speaks the word(s). The feature vector 605 may also include acoustic environment features 815 representing characteristics of the audio data 811 attributable to environment noise, reverberation, and user-to-mic distance. The feature vector 605 may also include random statistical noises 845 that represent how the user 5 may speak the word(s) in that way that deviates from the spoken word(s) features 805 but that nonetheless should corresponding to the feature vector 605 (e.g., that should nonetheless result in a positive recognition of the user).

The encoder 550 may output the feature vector 605 to the feature vector storage 685 (of the system 120) and/or the feature vector storage 787 (of the device 110). In at least some embodiments, it may be beneficial (e.g., for privacy considerations) to perform speaker recognition processing wholly on the device 110. In such embodiments, the feature vector generator 785 (of the device 110) may perform the processes described above with respect to FIG. 8. Moreover, in such embodiments where runtime speaker recognition processing is to be performed wholly on the device 110, the feature vector 605 may be stored in the feature vector storage 787 (of the device 110), but may not be stored in the feature vector storage 685 (of the system 120). In such embodiments, at runtime, the device 110 may simply provide, to the system 120, and indicator (e.g., a user identifier) representing a detected user.

Sometime after generating a feature vector 605 for use at runtime to recognize when the user 5 speaks a first word(s), the user 5 may indicate to the device 110/system 120 that the user 5 wants speaker recognition processing to be performed with respect to the user 5 using a second word(s). In at least some embodiments, such an indication may occur as a result of the user 5 indicating the user 5 wants to use a different wakeword to transition the device 110 from a sleep state to an active state.

Figure 9:
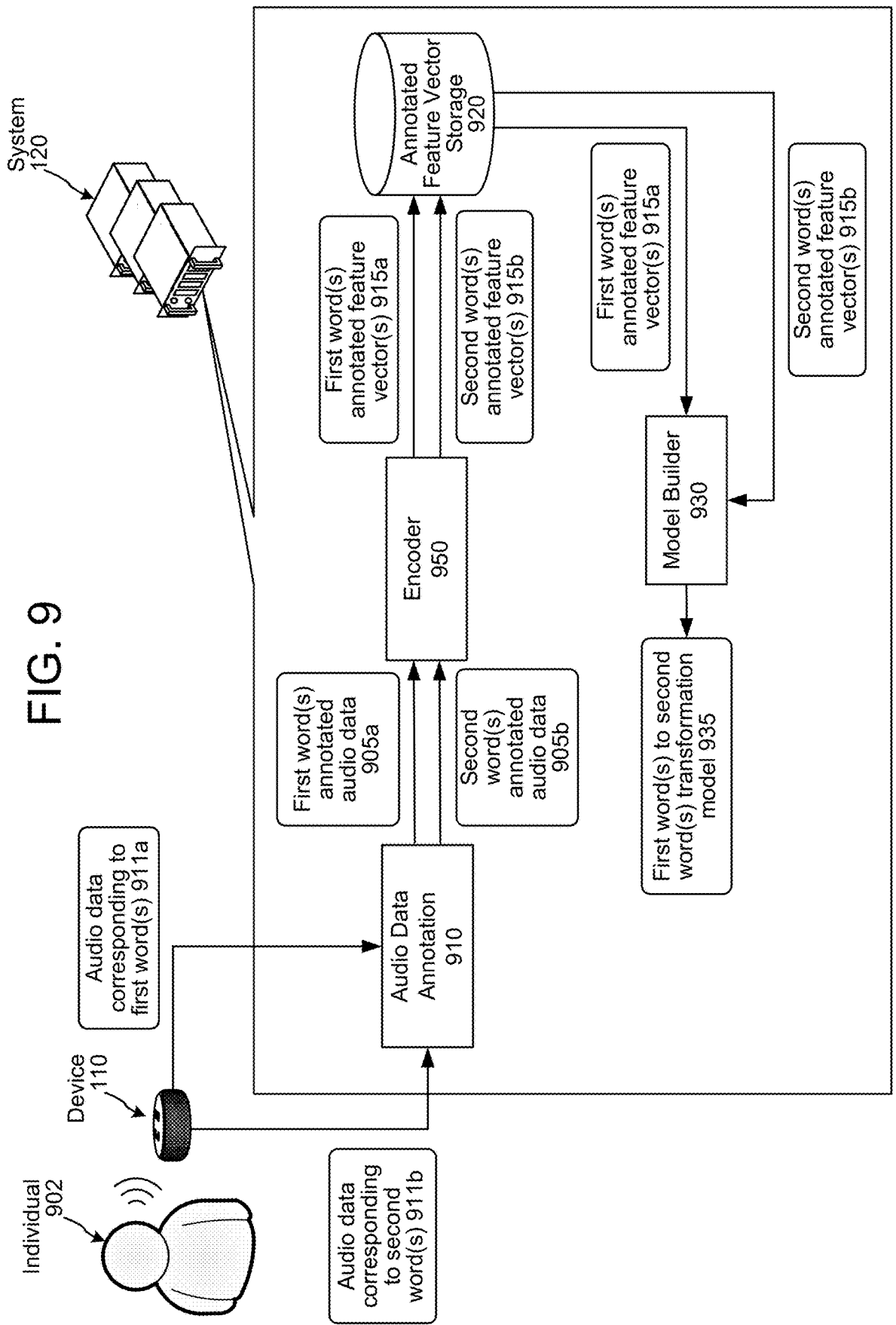
FIG. 9 is a conceptual diagram illustrating how a model, implemented by a system and/or a device, may be trained to generate a first word(s) to second word(s) transformation model, according to embodiments of the present disclosure.

In at least some situations, the system 120 and/or device 110 may not have previously received speech of the user 5 including the second word(s) to be used for speaker recognition processing. In other words, the system 120 and/or the device 110 may not know how the user 5 speaks the second word(s). However, the system 120 may know how one or more other individuals speak the second word(s). FIG. 9 illustrates how the system 120 may generate a first word(s) to second word(s) transformation model configured to generate, from a first feature vector specific to the first word(s), a second feature vector specific to the second word(s), without needing the user to again perform the herein described speaker recognition enrollment process.

As illustrated in FIG. 9, an individual 902 may speak the first word(s) to a device 110. In at least some embodiments, the individual 902 may be an employee of a corporate entity associated with the system 120. In at least some embodiments, the individual 902 may be a user 5 of the system 120 (e.g., an individual that may provide runtime spoken inputs). The device 110 may generate audio data 911a representing the spoken first word(s) (which may be a runtime spoken input, or a spoken input provided purely for offline training of the first word(s) to second word(s) transformation model), and may send the audio data 911a to the system 120. The system 120 may obtain prior authorization from the individual 902 prior to performing the processing of FIG. 9 with respect to speech of the individual 902.

The audio data 911a may be sent to an audio data annotation component 910 of the system 120. The audio data annotation component 910 may be configured to annotate portions of audio data corresponding to different words. For example, the audio data annotation component 910 may annotate a first portion of the audio data 911a as corresponding to a first word, a second portion of the audio data 911a as corresponding to a second word, etc. In at least some embodiments, the audio data annotation component 910 may perform frame level annotation. For example, the audio data annotation component 910 may annotate a first set of frames (e.g., frames 1-20) of the audio data 911a as corresponding to a first word, a second set of frames (e.g., frames 21-32) of the audio data 911a as corresponding to a second word, etc. In at least some embodiments, the audio data annotation component 910 may annotate the audio data 911a based on user inputs indicating portions of the audio data 911a corresponding to different words. The audio data annotation component 910 may output annotated audio data 905a comprising the first word(s).

The first word(s) annotated audio data 905a may be input to an encoder 950 that can create a fixed-size vector to represent certain characteristics of the first word(s) (and potential other words) represented in the audio data 911a. The encoder 950 may generate an annotated feature vector that represents feature values represented in the annotated audio data. The individual feature values may correspond to specific audio frames. Regardless of how many feature values are input, the encoder 950 may output vectors of the same size. The encoder 950 may be implemented as a neural network (NN), recurrent neural network (RNN), GMM, or other model. One particular example is a long short-term memory (LSTM) RNN. In addition, an attention model can be used, which is another RNN or deep neural network (DNN) that learns to "attract" attention to certain parts of the input.

For a given spoken input, the encoder 950 may generate a spoken input annotated feature vector (representing feature values corresponding to the spoken input) and/or one or more word(s) annotated feature vectors (each representing feature values corresponding to one or more specific words in the spoken input). The encoder 950 may output an annotated feature vector(s) 915a corresponding to at least the first word(s), which may be stored in an annotated feature vector storage 920. As used herein, an annotated feature vector may refer to a feature vector specifically identified as corresponding to one or more words.

The individual 902 may also speak the second word(s) to the same device 110 that the individual spoke the first word(s). The device 110 may generate audio data 911b representing the spoken second word(s) (which may be a runtime spoken input, or a spoken input provided purely for offline training of the first word(s) to second word(s) transformation model), and may send the audio data 911b to the system 120.

The audio data 911b may be sent to the audio data annotation component 910, which may process as described above to generate annotated audio data 905b comprising the second word(s).

The second word(s) annotated audio data 905b may be input to the encoder 950, which may process as described above to generate an annotated feature vector(s) 915b corresponding to at least the second word(s), which may be stored in the annotated feature vector storage 920.

The system 120 may determine, in the annotated feature vector storage 920, the first word(s) annotated feature vector(s) 915a and the second word(s) annotated feature vector(s) 915b. The system 120 may determine the annotated feature vectors 925a/925b by querying the annotated feature vector storage 920 for annotated feature vectors tagged as corresponding to the first word(s) and the second word(s).

The annotated feature vectors 915a/915b may be input to a model builder 930 configured to generate a first word(s) to second word(s) transformation model 935 configured to generate, from a feature vector 605 specific to the first word(s), a new feature vector 605 specific to the second word(s) to be used for speaker recognition processing going forward. In other words, the first word(s) to second word(s) transformation model may represent a transition from (or difference between) first features, corresponding to the first word(s) in the first word(s) annotated feature vector(s) 915a, to second features corresponding to the second word(s) in the second word annotated feature vector(s) 915b.

In at least some embodiments, the first word(s) to second word(s) transformation model 935 may be configured as a DNN. The model builder 930 may generate a DNN first word(s) to second word(s) transformation model 935 using the first word(s) annotated feature vector(s) 915a as an input, and using the second word(s) annotated feature vector(s) 915b as a target. In general, the first word(s) to second word(s) transformation model 935 may be considered relatively small since the first word(s) to second word(s) transformation model 935 may simply be trained to know a difference between speaking of first word(s) and speaking of the second word(s). The model builder 930 may tune the DNN first word(s) to second word(s) transformation model 935 to minimize a cosine distance between the second word(s) annotated feature vector(s) 915b and a feature vector generated using the first word(s) to second word(s) transformation model 935.

The system 120 may generate the first word(s) to second word(s) transformation model 935 prior to receiving the indication from the device 110 that the user 5 wants to use the second word(s) for user recognition processing going forward. Alternatively, the system 120 may generate the first word(s) to second word(s) transformation model 935 in response to receiving such an indication.

As described above, the first word(s) to second word(s) transformation model 935 may be trained using annotated feature vectors corresponding to the second word(s) that is to be used to perform speaker recognition processing at runtime. Thus, the first word(s) to second word(s) transformation model 935 may be referred to as a text-dependent transformation model.

While the foregoing describes the first word(s) to second word(s) transformation model 935 being generated using comparative utterances of a single individual 902, it will be appreciated that the model builder 930 may generate the first word(s) to second word(s) transformation model 935 using comparative utterances of more than one individual. In other words, the model builder 930 may generate the first word(s) to second word(s) transformation model 935 using corresponding first word(s) and second word(s) annotated feature vectors corresponding to different individuals. In such embodiments, the model builder 930 may train a DNN by using the first word(s) annotated feature vectors (of the different individuals) as inputs to the DNN, and the corresponding second word(s) annotated feature vectors (of the different individuals) as targets. The model builder 930 may tune the DNN first word(s) to second word(s) transformation model 935 to minimize a cosine distance between the second word(s) annotated feature vectors (of the different individuals) and corresponding feature vectors generated using the first word(s) to second word(s) transformation model 935.

In at least some embodiments, the first word(s) to second word(s) transformation model 935 may be trained using annotated feature vectors corresponding to various words including but not limited to the second word(s) that is to be used to perform speaker recognition processing at runtime. In these embodiments, the annotated feature vectors input to the model builder 930 may correspond to the various words including but not limited to the second word(s). When the model builder 930 inputs such annotated feature vectors, the resulting first word(s) to second word(s) transformation model 935 may be referred to as text-dependent and word-agnostic. This means that the first word(s) to second word(s) transformation model 935 may generate a feature vector corresponding to any word(s) the user 5 wants to use for speaker recognition processing, and that the word(s) to be used is not limited to the words used to train the first word(s) to second word(s) transformation model. It will thus be appreciated that a text-dependent, word-agnostic word(s) transformation model may be deeper and wider than a text-dependent word(s) transformation model. In at least some embodiments, a text-dependent, word-agnostic word(s) transformation model may be implemented as a DNN.

While it has been described that the system 120 may perform the processing described with respect to, and conceptually illustrated in FIG. 9, the present disclosure is not limited thereto. In at least some embodiments, a device 110 may perform the processing described with respect to, and conceptually illustrated in FIG. 9. In at least some other embodiments, the system 120 may perform a first portion of the processing described with respect to FIG. 9, while a device 110 performs a second portion of the processing described with respect to FIG. 9. For example, the system 120 may perform processing of FIG. 9 up through storage of the feature vectors 915 in the annotated feature vector storage 920, and a device 110 may implement the model builder 930 to generate the first word(s) to second word(s) transformation model 935. For further example, a device 110 may perform processing of FIG. 9 up through storage of the feature vectors 915 in the annotated feature vector storage 920, and the system 120 may implement the model builder 930 to generate the first word(s) to second word(s) transformation model 935.

In embodiments where the system 120/device 110 implements only text-dependent word transformation models 935, the system 120 may generate (and the system 120/device 110 may implement) multiple such models. For example, a first text-dependent word(s) transformation model may be configured to generate a feature vector specific to a first word(s) (e.g., a first wakeword) used to train the first text-dependent word(s) transformation model, a second text-dependent word(s) transformation model may be configured to generate a feature vector specific to a second word(s) (e.g., a second wakeword) used to train the second text-dependent word(s) transformation model, a third text-dependent word(s) transformation model may be configured to generate a feature vector specific to a third word(s) (e.g., a third wakeword) used to train the third text-dependent word(s) transformation model, etc. In contrast, the system 120 may generate (and the system 120/device 110 may implement) a single text-dependent, word-agnostic word(s) transformation model configured to generate feature vectors specific to various words (e.g., various wakewords), including but not limited to words used to train the text-dependent, word-agnostic word(s) transformation model.

Figure 10:
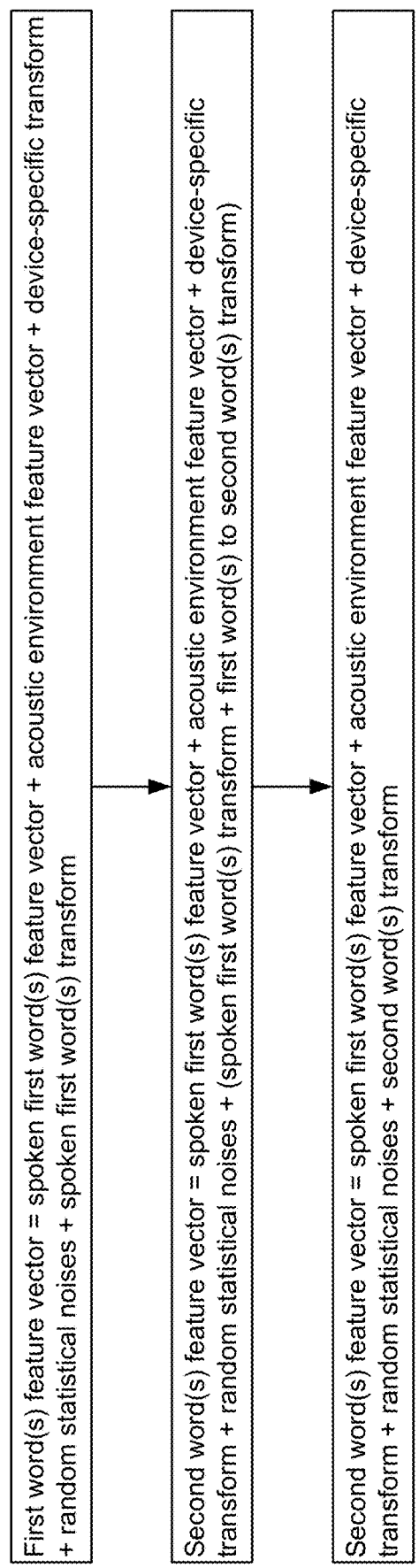
FIG. 10 is a conceptual diagram illustrating how a system and/or device may use a word(s) transformation model to generate a feature vector, according to embodiments of the present disclosure.

FIG. 10 illustrates an example of how the system 120 and/or device 110 may use the first word(s) to second word(s) transformation model 935 to generate a feature vector. The first word(s) feature vector may be represented as spoken first word(s) feature vector+acoustic environment feature vector+spoken first word(s) transform+device-specific transform+random statistical noises, with the "+" operation representing a non-linear transformation. Thus, application (by the system 120 and/or the device 110) of the first word(s) to second word(s) transformation model 935 to the first word(s) feature vector may be represented as spoken first word(s) feature vector+acoustic environment feature vector+device-specific transform+random statistical noises+ (spoken first word(s) transform+first word(s) to second word(s) transform). This may then be rewritten to spoken first word(s) feature vector+acoustic environment feature vector+device-specific transform+random statistical noises+ second word(s) transform. In the foregoing, the "+" operation may be a non-linear transformation performable by a DNN. It will be appreciated that the foregoing "+" operations may be inter-changed (i.e., may be performed in various orders) without departing from the present disclosure.

In at least some embodiments, speaker recognition processing may be influenced based on a device that captures a spoken input. For example, a user 5's feature vector [specific to a word(s)] may be generated with respect to capabilities of a first device (e.g., a quality of microphone(s) of the first device, echo cancelation functionality of the first device, etc.). As a result, the feature vector may be tuned for recognizing when the user 5 speaks the word(s) to the first device. Implementation of the same user 5's feature vector with respect to a spoken input captured by a second device (e.g., having a microphone(s) of a second quality) may result in less favorable speaker recognition processing as the feature vector is not tuned to the capabilities of the second device. In other words, speaker recognition processing may generate different confidence values when the same feature vector is applied to the same spoken word(s) captured by different devices (e.g., having different microphone qualities, having different echo cancelation functionalities, etc.). In at least some embodiments, the first device may include or otherwise be associated with a far-field microphone or microphone array, and the second device may include or otherwise be associated with a near-field microphone or microphone array.

Sometime after generating a feature vector 605 for use at runtime to recognize when the user 5 speaks a particular word(s) to a first device having certain capabilities (e.g., a device corresponding to a particular device type corresponding to a particular quality of microphone(s), a particular echo cancelation functionality, etc.), the user 5 may indicate that a second device (and more particularly a second device identifier) should be associated with the user 5's profile (or a group profile including the user 5's profile). In such a situation, it may be beneficial to perform speaker recognition processing with respect to the word(s) for the user 5 regardless of whether the user 5 speaks to the word(s) to first device or the newly associated second device.

Figure 11:
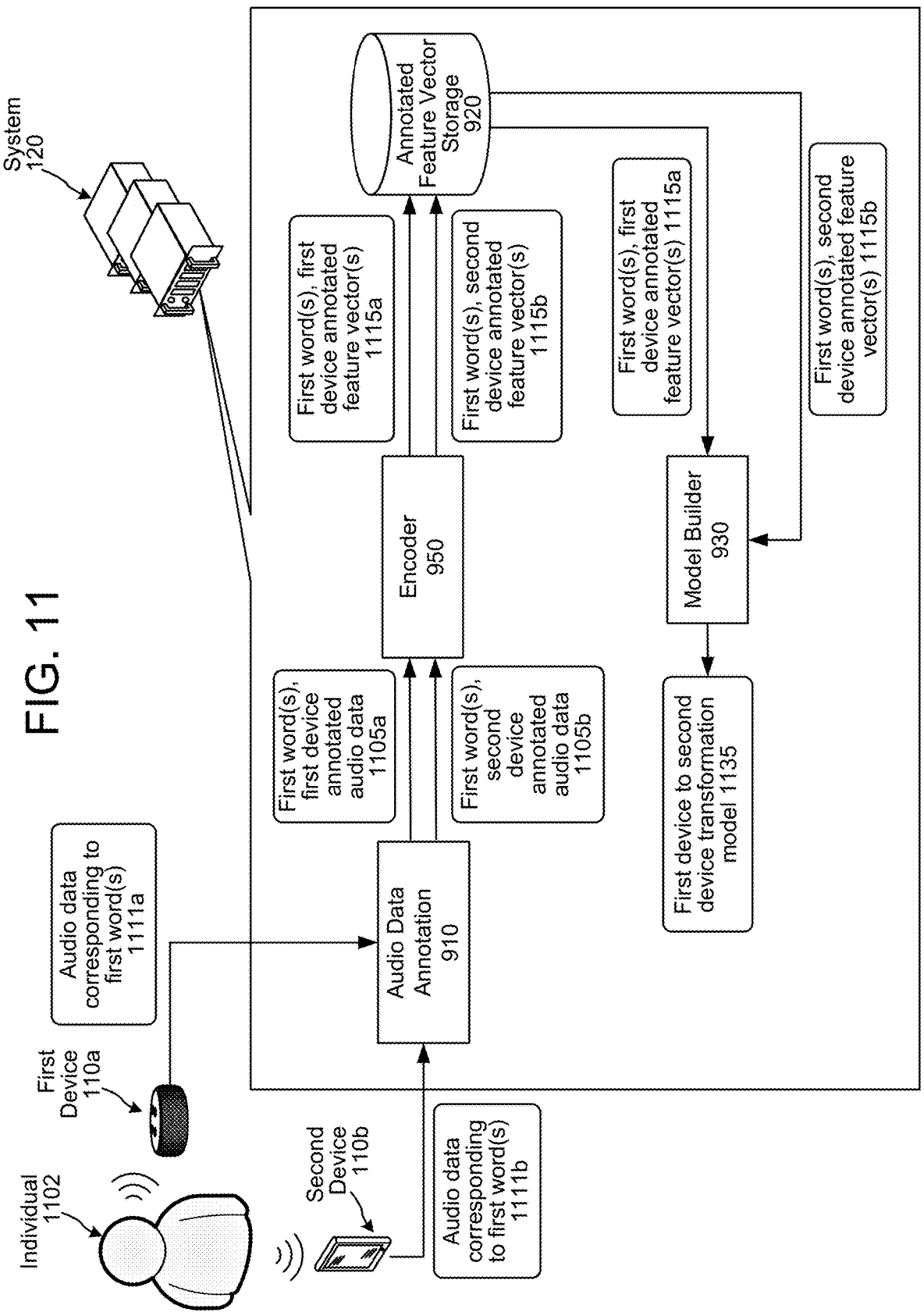
FIG. 11 is a conceptual diagram illustrating how a model, implemented by a system and/or a device, may be trained to generate, from a first feature vector specific to at least a first word(s) and a first device, a second feature vector specific to the at least a first word and a second device, according to embodiments of the present disclosure.

In at least some situations, the system 120 and/or device 110 may not have previously received speech of the user 5 including the word(s) as spoken to the second device (or another device corresponding to a same device type as the second device). In other words, the system 120 and/or the device 110 may not know how the second device will represent the word(s) (as spoken by the user 5) in audio data on which speaker recognition processing is to be performed. However, the system 120 may know how one or more devices, having the same capabilities as the second device of the user 5 (e.g., corresponding to a same device type as the second device) represent the word(s) in audio data. FIG. 11 illustrates how the system 120 may generate a first device to second device transformation model configured to generate, from a first feature vector specific to a word(s) and a first device having first capabilities, a second feature vector specific to the word(s) and a second device having second capabilities, without needing the user to again perform the herein described speaker recognition enrollment process.

As illustrated in FIG. 11, an individual 1102 may speak the word(s) to a first device 110a having particular capabilities (e.g., having a microphone(s) of a specific quality, having specific echo cancelation functionality, etc.). In at least some embodiments, the individual 1102 may be an employee of a corporate entity associated with the system 120. In at least some embodiments, the individual 1102 may be a user 5 of the system 120 (e.g., an individual that may provide runtime spoken inputs). The first device 110a may generate audio data 1111a representing the spoken word(s) (which may be a runtime spoken input, or a spoken input provided purely for offline training of the first device to second device transformation model), and may send the audio data 1111a to the system 120. The system 120 may obtain prior authorization from the individual 1102 prior to performing the processing of FIG. 11 with respect to speech of the individual 1102.

The audio data 1111a may be sent to the audio data annotation component 910 of the system 120. The audio data annotation component 910 may process the audio data 1111a, similarly to how the above describes the audio data annotation component 910 may process the audio data 911, to generate annotated audio data 1105a corresponding to digitized audio data tagged to indicate different portions corresponding to different words. The annotated audio data 1105a may also include data representing (or be associated with metadata representing) a first device type of the first device 110a, or one or more first capabilities of the first device 110a.

The annotated audio data 1105a may be input to the encoder 950. The encoder 950 may process the annotated audio data 1105a, similarly to how the above describes the encoder 950 may process the annotated audio data 905, to generate an annotated feature vector(s) 1115a including or otherwise being associated with a first device type of the first device 110a, or one or more first capabilities of the first device 110a. The annotated feature vector(s) 1115a may be stored in the annotated feature vector storage 920 (or a different storage depending on implementation). As used herein, the annotated feature vector(s) 1115a may refer to a feature vector specifically identified as corresponding to a word(s) as spoken to a device corresponding to a first device type (i.e., having first capabilities).

The individual 1102 may also speak the same word(s) to a second device 110b. The second device 110b may generate audio data 1111b representing the spoken word(s) (which may be a runtime spoken input, or a spoken input provided purely for offline training of the first device to second device transformation model), and may send the audio data 1111b to the system 120.

The audio data 1111b may be sent to the audio data annotation component 910, which may process the audio data 1111b, similarly to how the above describes the audio data annotation component 910 may process the audio data 911, to generate annotated audio data 1105b comprising the word(s) and representing (or being associated with metadata representing) a second device type of the second device 110b, or one or more second capabilities of the second device 110b.

The annotated audio data 1105b may be input to the encoder 950, which may process as described above to generate an annotated feature vector(s) 1115b including or otherwise being associated with a second device type of the second device 110b, or one or more second capabilities of the second device 110b. The annotated feature vector(s) 1115b may be stored in the annotated feature vector storage 920 (or a different storage depending on implementation).

The system 120 may determine, in the annotated feature vector storage 920, the first device annotated feature vector(s) 1115a and the second device annotated feature vector(s) 1115b. The system 120 may determine the annotated feature vectors 1115a/1115b by querying the annotated feature vector storage 920 for annotated feature vectors tagged as corresponding to the first device capabilities/first device type and the second device capabilities/second device type.

The annotated feature vectors 1115a/1115b may be input to the model builder 930 (or a different model builder depending on system configuration) configured to generate a first device to second device transformation model 1135 configured to generate, from a feature vector 605, specific to the word(s) and first device capabilities/a first device type, a new feature vector 605 specific to the word(s) and second device capabilities/a second device type. In other words, the first device to second device transformation model may represent a transition from (or difference between) first features, corresponding to the word in the first device annotated feature vector(s) 1115a, to second features corresponding to the same word(s) in the second device annotated feature vector(s) 915b.

In at least some embodiments, the first device to second device transformation model 1135 may be configured as a DNN. The model builder 930 may generate a DNN first device to second device transformation model 1135 using the first device annotated feature vector(s) 1115a as input, and using the second device annotated feature vector(s) 1115b as a target. In general, the first device to second device transformation model 1135 may be considered relatively small since the first device to second device transformation model 1135 may simply be trained to know a difference between speaking of a word(s) to different devices having different capabilities. The model builder 930 may tune the DNN first device to second device transformation model 1135 to minimize a cosine distance between the second device annotated feature vector(s) 1115b and a feature vector generated using the first device to second device transformation model 1135.

The system 120 may generate the first device to second device transformation model 1135 prior to receiving the indication that a new device is to be associated with the user 5's profile (and/or a corresponding group profile). Alternatively, the system 120 may generate the first device to second device transformation model 1135 in response to receiving such an indication.

As described above, the first device to second device transformation model 1135 may be trained using annotated feature vectors corresponding to the same word(s) that is to be used to perform speaker recognition processing at runtime. Thus, the first device to second device transformation model 1135 may be referred to as a text-dependent transformation model.

While the foregoing describes the first device to second device transformation model 1135 being generated using comparative utterances of a single individual 1102, it will be appreciated that the model builder 930 may generate the first device to second device transformation model 1135 using comparative utterances of more than one individual. In other words, the model builder 930 may generate the first device to second device transformation model 1135 using corresponding first device and second device annotated feature vectors corresponding to different individuals. In such embodiments, the model builder 930 may train a DNN by using the first device annotated feature vectors (of the different individuals) as inputs to the DNN, and the corresponding second device annotated feature vectors (of the different individuals) as targets. The model builder 930 may tune the DNN first device to second device transformation model 1135 to minimize a cosine distance between the second device annotated feature vectors (of the different individuals) and corresponding feature vectors generated using the first device to second device transformation model 1135.

In at least some embodiments, the first device to second device transformation model 1135 may be trained using annotated feature vectors corresponding to various words including but not limited to the word(s) that is to be used to perform speaker recognition processing at runtime. In these embodiments, the annotated feature vectors input to the model builder 930 may correspond to the various words including but not limited to the word(s) to be used to perform speaker recognition processing at runtime (but in any event the annotated feature vectors may all correspond to spoken inputs received by one or more devices having the same capabilities/corresponding to the same device type). When the model builder 930 inputs such annotated feature vectors, the resulting first device to second device transformation model 1135 may be referred to as text-dependent and word-agnostic. This means that the first device to second device transformation model 1135 may generate a second feature vector corresponding to any word(s) the user 5 wants to use for speaker recognition processing, and that the word(s) to be used is not limited to the words used to train the first device to second device transformation model 1135. It will thus be appreciated that a text-dependent, word-agnostic first device to second device transformation model 1135 may be deeper and wider than a text-dependent first device to second device transformation model 1135. In at least some embodiments, a text-dependent, word-agnostic first device to second device transformation model 1135 may be implemented as a DNN.

While it has been described that the system 120 may perform the processing described with respect to, and conceptually illustrated in FIG. 11, the present disclosure is not limited thereto. In at least some embodiments, a device 110 may perform the processing described with respect to, and conceptually illustrated in FIG. 11. In at least some other embodiments, the system 120 may perform a first portion of the processing described with respect to FIG. 11, while a device 110 performs a second portion of the processing described with respect to FIG. 11. For example, the system 120 may perform processing of FIG. 11 up through storage of the feature vectors 1115 in the annotated feature vector storage 920, and a device 110 may implement the model builder 930 to generate the first device to second device transformation model 1135. For further example, a device 110 may perform processing of FIG. 11 up through storage of the feature vectors 1115 in the annotated feature vector storage 920, and the system 120 may implement the model builder 930 to generate the first device to second device transformation model 1135.

Moreover, while FIGS. 9 and 11 show implementation of a same model builder 930, one skilled in the art will appreciate that the present disclosure is not limited thereto. For example, the system 120/a device 110 may implement a first model builder for generating the first word(s) to second word(s) transformation model 935, and a second model builder for generating the first device to second device transformation model 1135.

In embodiments where the system 120/device 110 implements only text-dependent first device to second device transformation models 1135, the system 120 may generate (and the system 120/device 110 may implement) multiple such models. For example, a first text-dependent first device to second device transformation model may be configured to generate a feature vector specific to a first word(s) (e.g., a first wakeword) used to train the first text-dependent first device to second device transformation model, a second text-dependent first device to second device transformation model may be configured to generate a feature vector specific to a second word(s) (e.g., a second wakeword) used to train the second text-dependent first device to second device transformation model, a third text-dependent first device to second device transformation model may be configured to generate a feature vector specific to a third word(s) (e.g., a third wakeword) used to train the third text-dependent first device to second device transformation model, etc. In contrast, the system 120 may generate (and the system 120/device 110 may implement) a single text-dependent, word-agnostic first device to second device transformation model configured to generate feature vectors specific to various words (e.g., various wakewords), including but not limited to words used to train the text-dependent, word-agnostic first device to second device transformation model.

Figure 12:
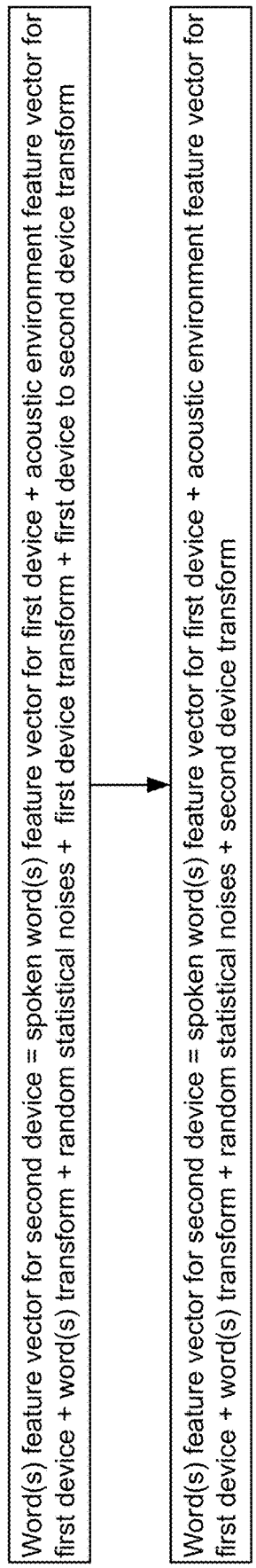
FIG. 12 is a conceptual diagram illustrating how a system and/or device may use a device transformation model to generate a feature vector, according to embodiments of the present disclosure.

FIG. 12 illustrates an example of how the system 120 and/or device 110 may use the first device to second device transformation model 1135 to generate a feature vector. A word(s)-specific feature vector for a first device may be represented as spoken first word(s) feature vector for first device+acoustic environment feature vector for first device+word(s) transform+first device transform+random statistical noises, with the "+" operation representing a non-linear transformation. Thus, application (by the system 120 and/or the device 110) of the first device to second device transformation model 1135 to the foregoing feature vector may be represented as spoken first word(s) feature vector for first device+acoustic environment feature vector for first device+word(s) transform+random statistical noises+first device transform+first device to second device transform. This may then be rewritten to spoken first word(s) feature vector for first device+acoustic environment feature vector for first device+word(s) transform+random statistical noises+second device transform. In the foregoing, the "+" operation may be a non-linear transformation performable by a DNN. It will be appreciated that the foregoing "+" operations may be inter-changed (i.e., may be performed in various orders) without departing from the present disclosure.

While FIG. 12 illustrates use of a first device to second device transform, the present disclosure is not limited thereto. For example, the processes of FIGS. 11 and 12 may be altered to create and implement a transformation model for generating, from a first feature vector implemented by the system 120, a second feature vector implemented by a device 110. In such embodiments, the first device to second device transform in FIG. 12 may be replaced with a system to device transform.

Figure 13:
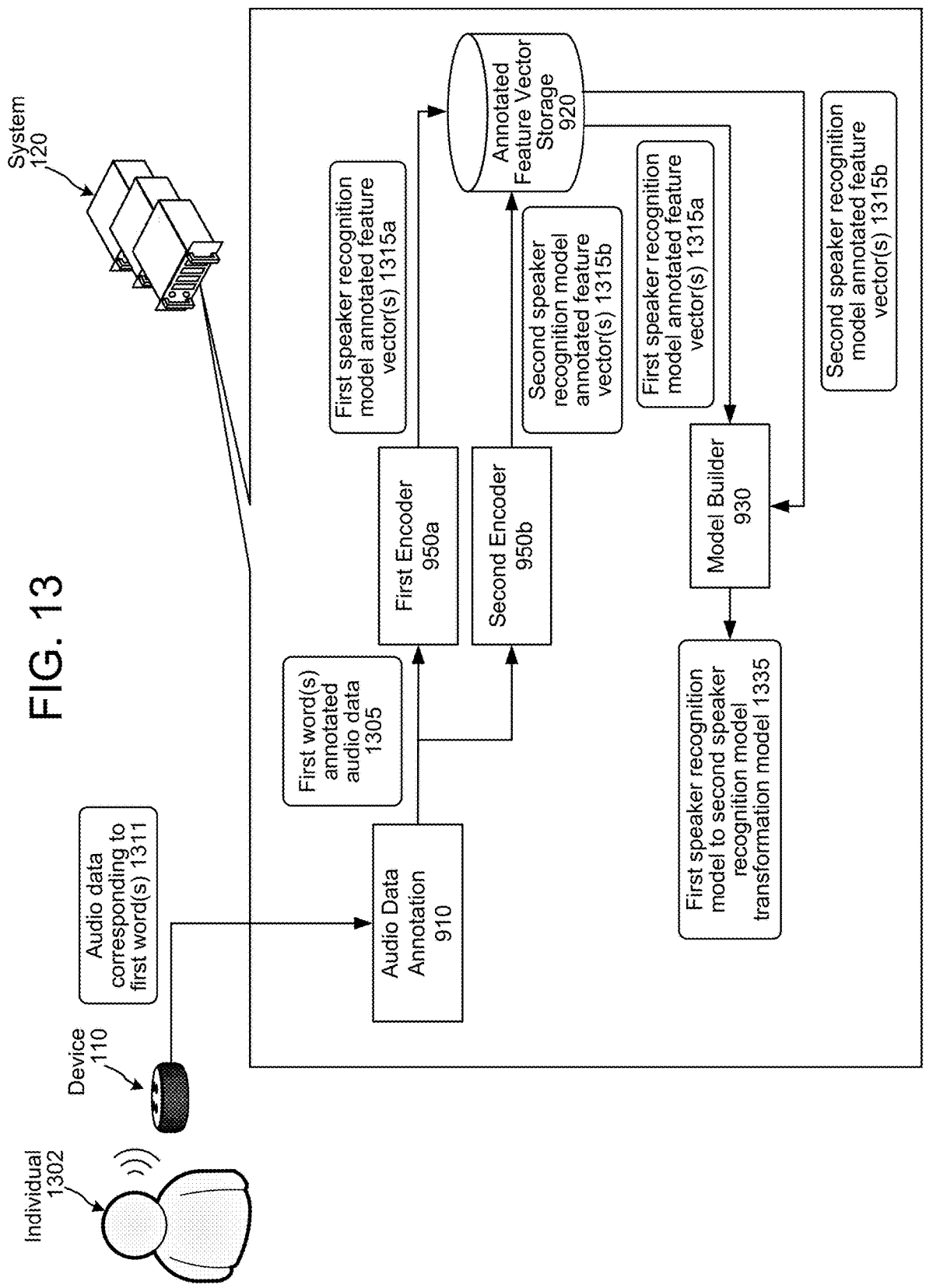
FIG. 13 is a conceptual diagram illustrating how a model, implemented by a system and/or a device, may be trained to generate, from a first feature vector specific to at least a first word(s) and generated using a first speaker recognition model, a second feature vector specific to the at least a first word and generated using a second speaker recognition model, according to embodiments of the present disclosure.

In at least some embodiments, speaker recognition processing may be influenced based on a first version of a speaker recognition model (trained using first training data) being used to generate a stored feature vector corresponding to a word(s), and a second version of the speaker recognition model (training using second training data) being used at runtime to generate a feature vector corresponding to the word(s) (which is to be compared to the stored feature vector to perform speaker recognition processing). For example, a user 5's stored feature vector [specific to a word(s)] may be generated using a first speaker recognition model trained using first training data. Thereafter, a second speaker recognition model (trained using second training data) may be implemented for generating feature vectors representing runtime spoken input. As the stored feature vector and a runtime feature vector are generated using different speaker recognition models, comparison of the feature vectors may result in inaccurate speaker recognition. FIG. 13 illustrates how the system 120 may generate a first speaker recognition model to second speaker recognition model transformation model configured to generate, from a first feature vector specific to a word(s) and generated using the first speaker recognition model, a second feature vector specific to the word(s) and generated using the second speaker recognition model, without needing the user to again perform the herein described speaker recognition enrollment process.

As illustrated in FIG. 13, an individual 1302 may speak a word(s) to a device 110. In at least some embodiments, the individual 1302 may be an employee of a corporate entity associated with the system 120. In at least some embodiments, the individual 1302 may be a user 5 of the system 120 (e.g., an individual that may provide runtime spoken inputs). The device 110 may generate audio data 1311 representing the spoken word(s) (which may be a runtime spoken input, or a spoken input provided purely for offline training of the first speaker recognition model to second speaker recognition model transformation model), and may send the audio data 1311 to the system 120. The system 120 may obtain prior authorization from the individual 1302 prior to performing the processing of FIG. 13 with respect to speech of the individual 1302.

The audio data 1311 may be sent to the audio data annotation component 910 of the system 120. The audio data annotation component 910 may process the audio data 1311, similarly to how the above describes the audio data annotation component 910 may process the audio data 911, to generate annotated audio data 1305 corresponding to digitized audio data tagged to indicate different portions corresponding to different words.

The annotated audio data 1305 may be input to a first encoder 950a. The first encoder 950a may implement a first speaker recognition model trained using first data. The first encoder 950a may process the annotated audio data 1305, similarly to how the above describes the encoder 950 may process the annotated audio data 905, to generate an annotated feature vector(s) 1315a. The annotated feature vector(s) 1315a may be stored in the annotated feature vector storage 920 (or a different storage depending on implementation).

When the individual 1302 speaks the first word(s) resulting in generation of the audio data 1311, the system 120 may already be configured to implement an updated version of the first speaker recognition model, referred to as a second speaker recognition model herein. Thus, before, at least partially in parallel, or after inputting the annotated audio data 1305 into the first encoder 950a, the annotated audio data 1305 may be input to a second encoder 950b that implements the second speaker recognition model. The second encoder 950b may process the annotated audio data 1305, similarly to how the above describes the encoder 950 may process the annotated audio data 905, to generate an annotated feature vector(s) 1315b. The annotated feature vector(s) 1315b may be stored in the annotated feature vector storage 920 (or a different storage depending on implementation).

In at least some situations, the system 120 may not implement the second speaker recognition model until after the individual 1302 speaks the first word(s) resulting in the audio data 1311. In such situations, to enable processing by a later-configured second encoder 950b, the system 120 may store the audio data 1311 and/or annotated audio data 1305. Prior to storing such data, the system 120 may obtain permission of the individual 1302 to store such data.

Furthering the foregoing situation, once the system 120 is configured to implement the second encoder 950b, the system 120 may recall the stored audio data 1311 from storage, run the audio data 1311 through the audio data annotation component 910 to again generate the annotated audio data 1305, and then input the annotated audio data 1305 into the second encoder 950b. Alternatively, once the system 120 is configured to implement the second encoder 950b, the system 120 may recall the annotated audio data 1305 from storage and input the annotated audio data 1305 into the second encoder 950b.

Sometime after generating the annotated feature vector(s) 1315b using the second encoder 950b, the system 120 may determine, in the annotated feature vector storage 920, the first speaker recognition model-generated annotated feature vector(s) 1315a and the second speaker recognition model-generated annotated feature vector(s) 1315b. The system 120 may determine the annotated feature vectors 1315a/1315b by querying the annotated feature vector storage 920 for annotated feature vectors tagged as corresponding to the first speaker recognition model and the second speaker recognition model.

The annotated feature vectors 1315a/1315b may be input to the model builder 930 (or a different model builder depending on system configuration) configured to generate a first speaker recognition model to second speaker recognition model transformation model 1335 configured to generate, from a feature vector 605, specific to a word(s) and first speaker recognition model capabilities, a new feature vector 605 specific to the word(s) and second speaker recognition model capabilities. In other words, the first speaker recognition model to second speaker recognition model transformation model 1335 may represent a transition from (or difference between) first features, corresponding to the word(s) in the first speaker recognition model-generated annotated feature vector(s) 1315a, to second features corresponding to the same word(s) in the second speaker recognition model-generated annotated feature vector(s) 1315b.

In at least some embodiments, the first speaker recognition model to second speaker recognition model transformation model 1335 may be configured as a DNN. The model builder 930 may generate a DNN first speaker recognition model to second speaker recognition model transformation model 1335 using the first speaker recognition model-generated annotated feature vector(s) 1315a as input, and using the second speaker recognition model-generated annotated feature vector(s) 1315b as a target. In general, the first speaker recognition model to second speaker recognition model transformation model 1335 may be considered relatively small since the first speaker recognition model to second speaker recognition model transformation model 1335 may simply be trained to know a difference between feature vectors [corresponding to a same word(s)] being generated using different speaker recognition models. The model builder 930 may tune the DNN first speaker recognition model to second speaker recognition model transformation model 1335 to minimize a cosine distance between the second speaker recognition model-generated annotated feature vector(s) 1315b and a feature vector generated using the first speaker recognition model to second speaker recognition model transformation model 1335.

As described above, the first speaker recognition model to second speaker recognition model transformation model 1335 may be trained using annotated feature vectors corresponding to the same word(s) that is to be used to perform speaker recognition processing at runtime. Thus, the first speaker recognition model to second speaker recognition model transformation model 1335 may be referred to as a text-dependent transformation model.

While the foregoing describes the first speaker recognition model to second speaker recognition model transformation model 1335 being generated using comparative utterances of a single individual 1102, it will be appreciated that the model builder 930 may generate the first speaker recognition model to second speaker recognition model transformation model 1335 using comparative utterances of more than one individual. In other words, the model builder 930 may generate the first speaker recognition model to second speaker recognition model transformation model 1335 using corresponding first speaker recognition model-generated and second speaker recognition model-generated annotated feature vectors corresponding to different individuals. In such embodiments, the model builder 930 may train a DNN by using the first speaker recognition model-generated annotated feature vectors (of the different individuals) as inputs to the DNN, and the corresponding second speaker recognition model-generated annotated feature vectors (of the different individuals) as targets. The model builder 930 may tune the DNN first speaker recognition model to second speaker recognition model transformation model 1335 to minimize a cosine distance between the second speaker recognition model-generated annotated feature vectors (of the different individuals) and corresponding feature vectors generated using the first speaker recognition model to second speaker recognition model transformation model 1335.

In at least some embodiments, the first speaker recognition model to second speaker recognition model transformation model 1335 may be trained using annotated feature vectors corresponding to various words including but not limited to the word(s) that is to be used to perform speaker recognition processing at runtime. In these embodiments, the annotated feature vectors input to the model builder 930 may correspond to the various words including but not limited to the word(s) to be used to perform speaker recognition processing at runtime. When the model builder 930 inputs such annotated feature vectors, the resulting first speaker recognition model to second speaker recognition model transformation model 1335 may be referred to as text-dependent and word-agnostic. A text-dependent, word-agnostic first speaker recognition model to second speaker recognition model transformation model 1335 may be deeper and wider than a text-dependent first speaker recognition model to second speaker recognition model transformation model 1335. In at least some embodiments, a text-dependent, word-agnostic first speaker recognition model to second speaker recognition model transformation model 1335 may be implemented as a DNN.

While it has been described that the system 120 may perform the processing described with respect to, and conceptually illustrated in FIG. 13, the present disclosure is not limited thereto. In at least some embodiments, a device 110 may perform the processing described with respect to, and conceptually illustrated in FIG. 13. In at least some other embodiments, the system 120 may perform a first portion of the processing described with respect to FIG. 13, while a device 110 performs a second portion of the processing described with respect to FIG. 13. For example, the system 120 may perform processing of FIG. 13 up through storage of the feature vectors 1315 in the annotated feature vector storage 920, and a device 110 may implement the model builder 930 to generate the first speaker recognition model to second speaker recognition model transformation model 1335. For further example, a device 110 may perform processing of FIG. 13 up through storage of the feature vectors 1315 in the annotated feature vector storage 920, and the system 120 may implement the model builder 930 to generate the first speaker recognition model to second speaker recognition model transformation model 1335.

Moreover, while FIGS. 9, 11, and 13 show implementation of a same model builder 930, one skilled in the art will appreciate that the present disclosure is not limited thereto. For example, the system 120/a device 110 may implement a first model builder for generating the first word(s) to second word(s) transformation model 935, a second model builder for generating the first device to second device transformation model 1135, and a third model builder for generating the first speaker recognition model to second speaker recognition model transformation model 1335.

In embodiments where the system 120/device 110 implements only text-dependent first speaker recognition model to second speaker recognition model transformation models 1335, the system 120 may generate (and the system 120/device 110 may implement) multiple such models. For example, a first text-dependent first speaker recognition model to second speaker recognition model transformation model may be configured to generate a feature vector specific to a first word(s) (e.g., a first wakeword) used to train the first text-dependent first speaker recognition model to second speaker recognition model transformation model, a second text-dependent first speaker recognition model to second speaker recognition model transformation model may be configured to generate a feature vector specific to a second word(s) (e.g., a second wakeword) used to train the second text-dependent first speaker recognition model to second speaker recognition model transformation model, a third text-dependent first speaker recognition model to second speaker recognition model transformation model may be configured to generate a feature vector specific to a third word(s) (e.g., a third wakeword) used to train the third text-dependent first speaker recognition model to second speaker recognition model transformation model, etc. In contrast, the system 120 may generate (and the system/device 110 may implement) a single text-dependent, word-agnostic first speaker recognition model to second speaker recognition model transformation model configured to generate feature vectors specific to various words (e.g., various wakewords), including but not limited to words used to train the text-dependent, word-agnostic first speaker recognition model to second speaker recognition model transformation model.

Figure 14:
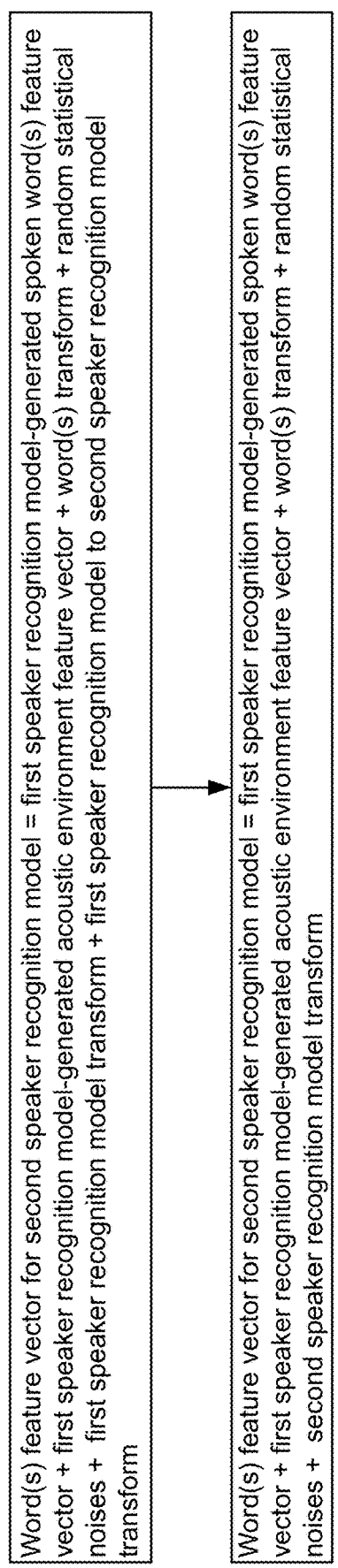
FIG. 14 is a conceptual diagram illustrating how a system and/or device may use a speaker recognition model transformation model to generate a feature vector, according to embodiments of the present disclosure.

FIG. 14 illustrates an example of how the system 120 and/or device 110 may use the first speaker recognition model to second speaker recognition model transformation model 1335 to generate a feature vector. A word(s)-specific feature vector (generated using the first speaker recognition model) may be represented as first speaker recognition model-generated spoken word(s) feature vector for first device+first speaker recognition model-generated acoustic environment feature vector for first device+word(s) transform+first speaker recognition model transform+random statistical noises, with the "+" operation representing a non-linear transformation. Thus, application (by the system 120 and/or the device 110) of the first speaker recognition model to second speaker recognition model transformation model 1335 to the foregoing feature vector may be represented as first speaker recognition model-generated spoken word(s) feature vector+first speaker recognition model-generated acoustic environment feature vector+word(s) transform+random statistical noises+first speaker recognition model transform+first speaker recognition model to second speaker recognition model transform. This may then be rewritten to first speaker recognition model-generated spoken word(s) feature vector+first speaker recognition model-generated acoustic environment feature vector+word(s) transform+random statistical noises+second speaker recognition model transform. In the foregoing, the "+" operation may be a non-linear transformation performable by a DNN. It will be appreciated that the foregoing "+" operations may be inter-changed (i.e., may be performed in various orders) without departing from the present disclosure.

According to the foregoing disclosure, it will be appreciated that a single user identifier may be associated with multiple speaker recognition feature vectors. For example, a single user identifier may be associated with a first feature vector corresponding to a first word(s), a second feature vector corresponding a second word(s), a third feature vector corresponding to the first word(s) as represented in audio data output by a first device, a fourth feature vector corresponding to a third word(s) as represented in audio data output by a second device, etc.

As such, the device 110 and/or system 120 may selectively perform speaker recognition processing based on a word(s) detected by the device 110 at runtime. In at least some embodiments, the device 110 may send an indication of a detected wakeword (or wakeword phrase) to a speaker recognition component (either implemented by the device 110 or the system 120). In response, the speaker recognition component may perform speaker recognition processing with respect to stored feature vectors associated with the device 110 and the detected wakeword or wakeword phrase (rather than all feature vectors associated with the device 110, which may correspond to different wakewords/wakeword phrases). It will be appreciated that such selective speaker recognition processing may decrease latency since the feature vectors considered may be tailored to the particular spoken input (rather than all feature vectors associated with the device 110 that received the spoken input).

In at least some embodiments, a device 110 may not implement a wakeword detection component. Instead, audio data (corresponding to audio received by the device 110) may be sent to an on-device ASR component that recognizes speech, and processing may be performed on the ASR output data to determine whether the speech is directed to the device 110 and/or system 120. In such embodiments, speaker recognition processing may be performed based on a word(s) recognized by the on-device ASR component. For example, a speaker recognition component (of the device 110 and/or the system 120) may perform speaker recognition processing with respect to stored feature vectors associated with the device 110 and a word(s) recognized by the ASR component (rather than all feature vectors associated with the device 110, which may not correspond to any words recognized by the ASR component). It will be appreciated that such selective speaker recognition processing may decrease latency since the feature vectors considered may be tailored to the particular spoken input (rather than all feature vectors associated with the device 110 that received the spoken input).

When speaker recognition processing is to be performed locally by a device 110, the device 110 may receive (from the system 120) a word(s) transformation model(s) and/or a device transformation model so the device 110 may locally generate speaker recognition features. Such may enable greater user privacy as such may prevent the need to send a user 5's feature vector to the system 120.

In at least some embodiments, recognition of a speaking user, as described herein, may function as user authentication. For example, the user may cause a device 110 and/or the system 120 to generate a feature vector associated with the user's identifier and corresponding to a particular spoken phrase. Recognition of the user based on a spoken input corresponding to the foregoing feature vector may function as the user's authorization to perform some task (e.g., such recognition may function as receipt of a traditional passcode, password, or other login/account credentials).

As detailed herein, a feature vector may correspond to more than one word. In at least some embodiments, a feature vector may correspond to a runtime spoken input in which the more than one word is spoken in a particular order. Thus, it may be beneficial for training data (input to the model builder 930 for purposes of generating a transformation model) to include feature vectors corresponding to training spoken inputs in which the words are spoken in the particular order. However, the present disclosure is not limited thereto, and the training data may include a training spoken input in which the words are spoken in a different order. Moreover, in at least some embodiments, the annotated feature vector storage 920 may not store a single feature vector that corresponds to a single training spoken input including all of the words to be considered at runtime for speaker recognition processing. In such embodiments, the model builder 930 may receive multiple annotated feature vectors (corresponding to different training spoken inputs) that, when combined, represent all of the words to be considered at runtime for speaker recognition processing.

In at least some embodiments, a particular feature vector of a user 5 may correspond to a word(s) and an action. For example, a user identifier may be associated with a feature vector corresponding to a word(s) and an action to output weather information. A single user identifier may be associated with multiple such feature vectors, with each feature vector corresponding to a respective word(s) and action. Thus, at runtime when a speaker recognition component (of the device 110 or the system 120) determines a spoken input corresponds to a particular feature vector, the device 110 and/or the system 120 may cause an action (corresponding to the particular feature vector) to be performed.

In at least some embodiments, a particular feature vector of a user 5 may correspond to a word(s), an action, and a particular context. For example, a user identifier may be associated with a first feature vector corresponding to a word(s), a first action to order the user 5's preferred breakfast food (as represented in the user's profile), and a first time of day (e.g., before noon). The user identifier may also be associated with a second feature vector corresponding to the word(s), a second action to order the user 5's preferred dinner food (as represented in the user's profile), and a second time of day (e.g., evening). Thus, at runtime, the action performed by the device 110 and/or system 120 may depend on the feature vector that corresponds to the spoken input, and the context corresponding to the spoken input. While the foregoing discusses time of day as context information that may be associated with a feature vector, it will be appreciated that various context information may be associated with a single feature vector, including but not limited to device state (e.g., whether the device 110 was outputting content when the device 110 captured the runtime spoken input), device output capabilities (e.g., whether the device 110 has or is otherwise associated with a display), geographic location of the device 110, etc. In at least some embodiments, a speaker recognition component (of the device 110 or the system 120) may selectively perform speaker recognition processing using one or more feature vectors associated with a context corresponding to the spoken input.

Figure 15:
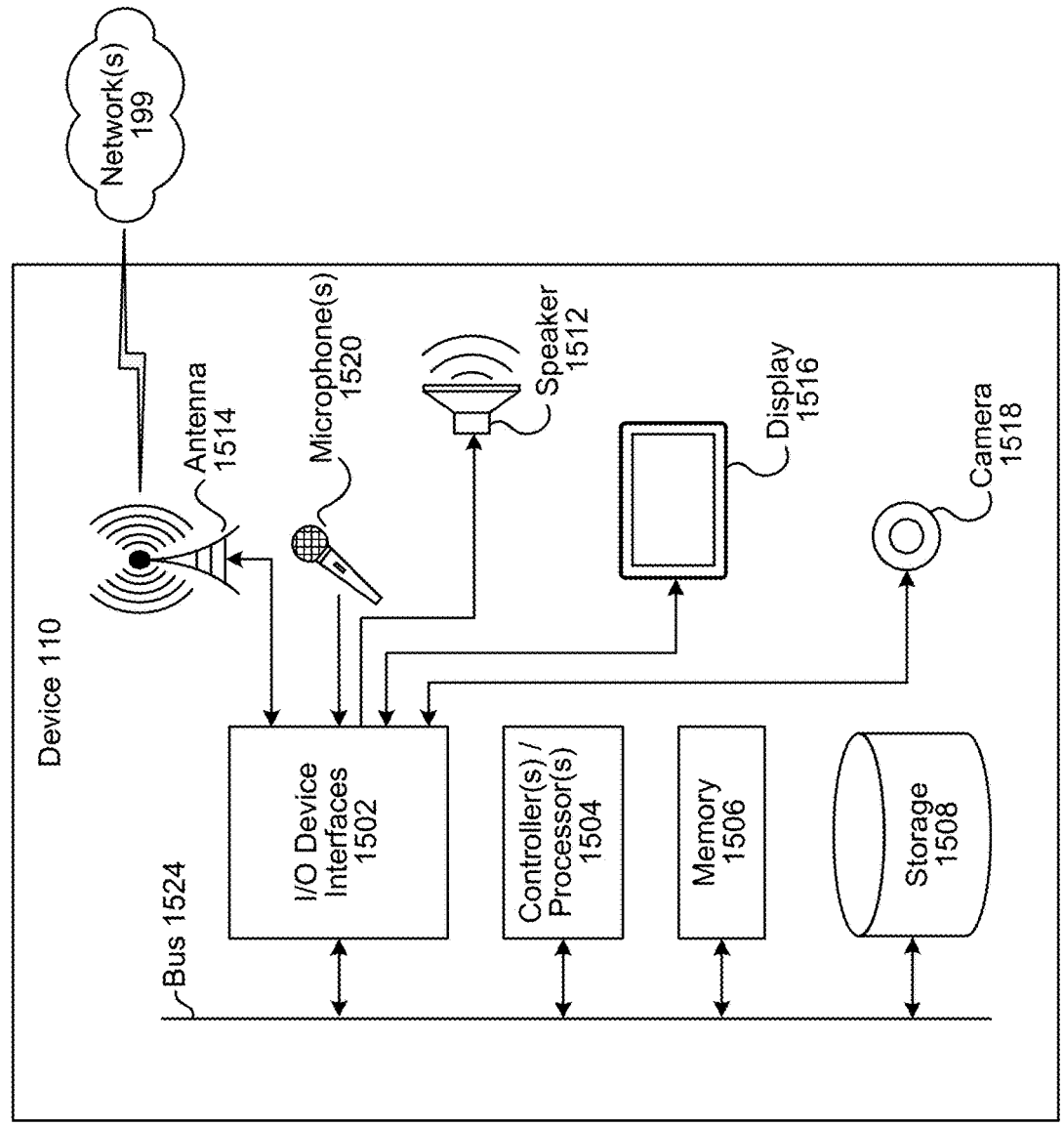
FIG. 15 is a block diagram conceptually illustrating example components of a device, according to embodiments of the present disclosure.
Figure 16:
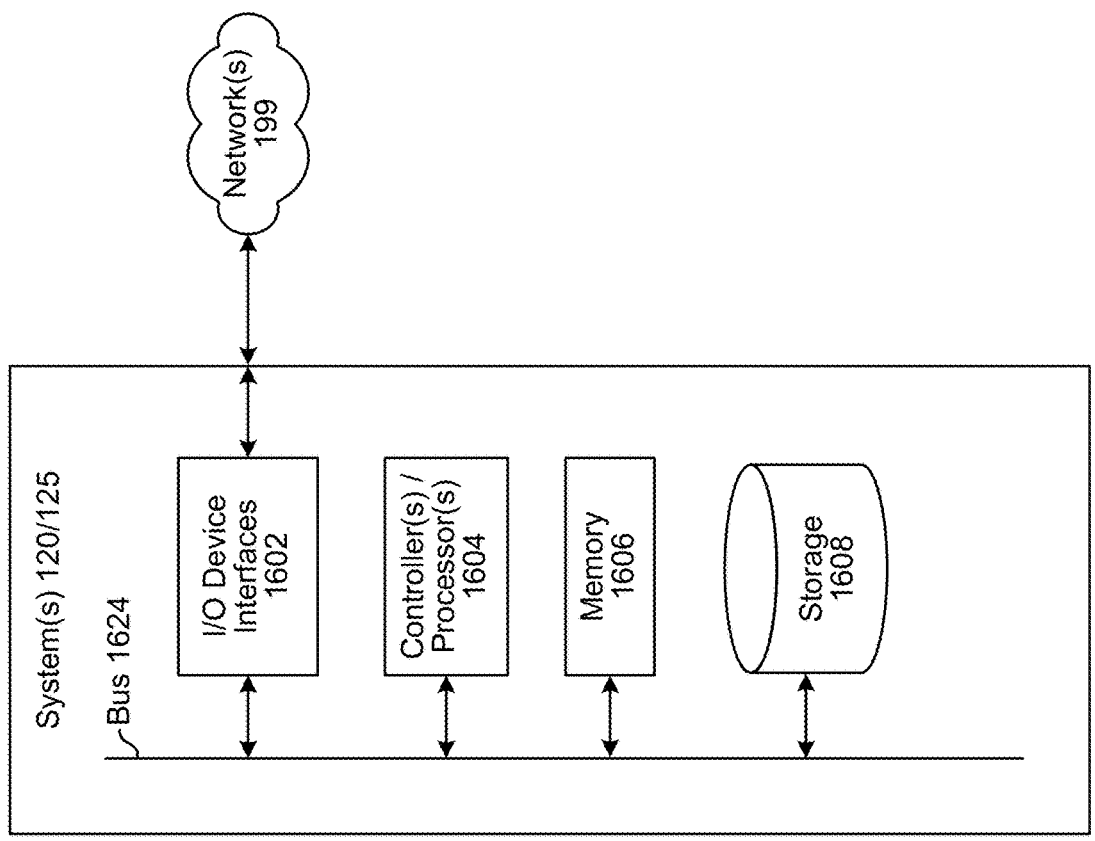
FIG. 16 is a block diagram conceptually illustrating example components of a system, according to embodiments of the present disclosure.

FIG. 15 is a block diagram conceptually illustrating example components of a device 110 according to the present disclosure. FIG. 16 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1502/1602).

Computer instructions for operating each device (110/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/125) includes input/output device interfaces (1502/1602). A variety of components may be connected through the input/output device interfaces (1502/1602), as will be discussed further below. Additionally, each device (110/120/125) may include an address/data bus (1524/1624) for conveying data among components of the respective device. Each component within a device (110/120/125) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (1502/1602), processor(s) (1504/1604), memory (1506/1606), and/or storage (1508/1608) of the device(s) 110, system 120, or the skill system 125, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 17:
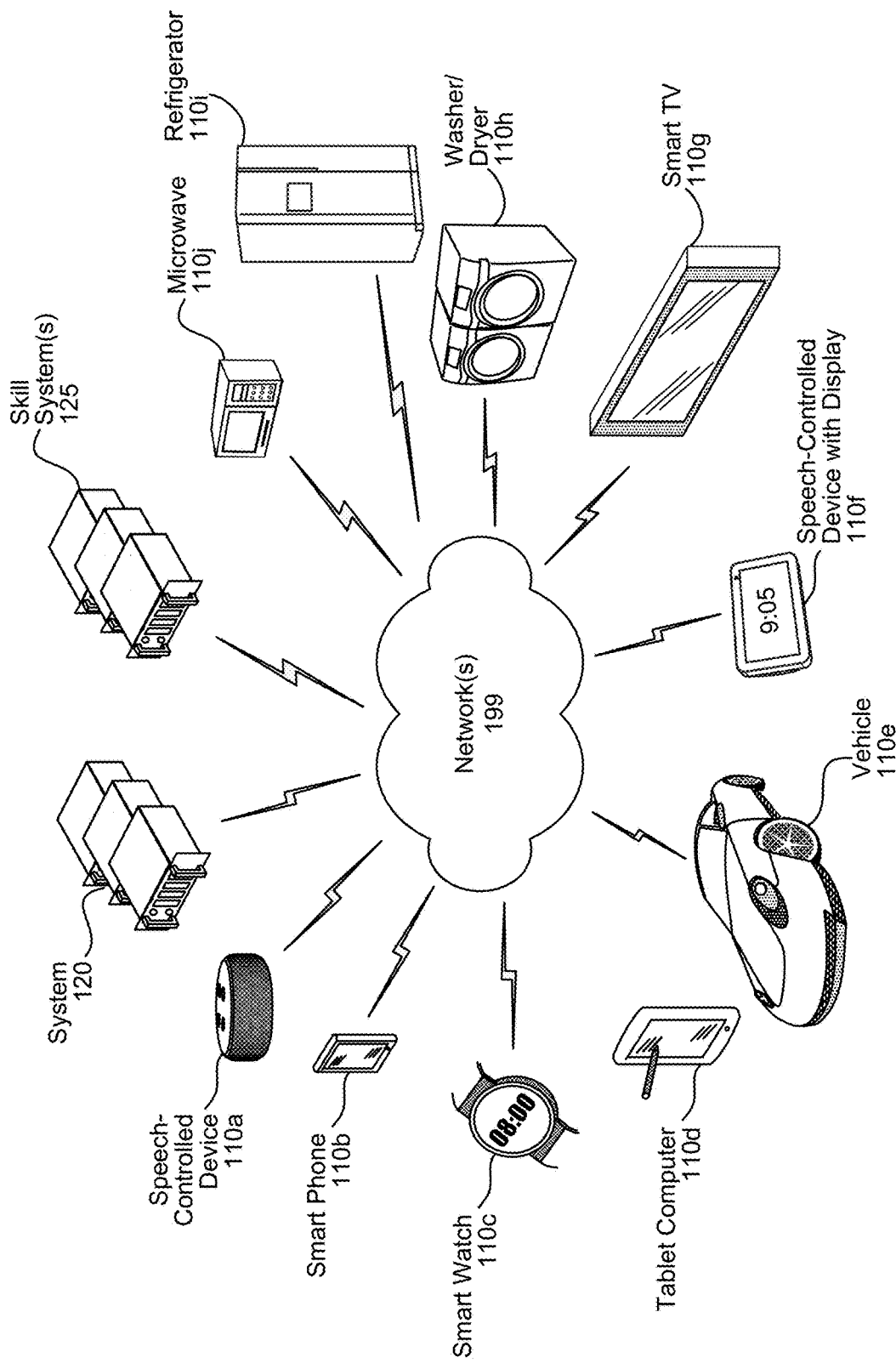
FIG. 17 illustrates an example of a computer network for use with the overall system, according to embodiments of the present disclosure.

As illustrated in FIG. 17, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first data corresponding to at least a first user speaking first content;

receiving second data representing a transformation between how at least a second user is known to speak the first content and how the at least second user is known to speak second content; and using the first data and the second data to configure a machine learning (ML) model to detect the first user speaking the second content.

2. The computer-implemented method of claim 1, further comprising:

receiving input audio data; and processing the input audio data using the ML model to determine the input audio data represents speech of the first user.

3. The computer-implemented method of claim 2, wherein:

configuration of the ML model is performed by a first device; and processing the input audio data is performed by a second device.

4. The computer-implemented method of claim 1, further comprising:

receiving third data corresponding to the first user speaking the second content, wherein configuration of the ML model further uses the third data.

5. The computer-implemented method of claim 1, further comprising:

receiving third data corresponding to at least the first user speaking the second content; and processing the first data and the third data to determine fourth data representing a transformation between first speech characteristics and second speech characteristics, the first speech characteristics corresponding to the first content and the second speech characteristics corresponding to the second content, wherein the fourth data corresponds to the ML model.

6. The computer-implemented method of claim 1, wherein the first data further corresponds to a third user speaking the first content.

7. The computer-implemented method of claim 1, wherein:

the first content corresponds to a first wakeword; and the second content corresponds to a second wakeword different from the first wakeword.

8. The computer-implemented method of claim 1, wherein the first data corresponds to at least one quality of frequency domain audio data representing the first user speaking the first content.

9. The computer-implemented method of claim 8, further comprising:

processing the frequency domain audio data using a feature extraction component to determine the first data.

10. The computer-implemented method of claim 1, further comprising:

receiving annotation data corresponding to the first data, wherein configuration of the ML model further uses the annotation data.

11. A system comprising:

at least one processor; and at least one memory comprising instructions that, when executed by the at least one processor, cause the system to:

receive first data corresponding to at least a first user speaking first content;

receive second data representing a transformation between how at least a second user is known to speak the first content and how the at least second user is known to speak second content; and use the first data and the second data to configure a machine learning (ML) model to detect the first user speaking the second content.

12. The system of claim 11, wherein the at least one memory further comprises instructions that, when executed by the at least one processor, further cause the system to:

receive input audio data; and process the input audio data using the ML model to determine the input audio data represents speech of the first user.

13. The system of claim 12, wherein:

configuration of the ML model is performed by a first device; and processing the input audio data is performed by a second device.

14. The system of claim 11, wherein the at least one memory further comprises instructions that, when executed by the at least one processor, further cause the system to:

receive third data corresponding to the first user speaking the second content, wherein configuration of the ML model further uses the third data.

15. The system of claim 11, wherein the at least one memory further comprises instructions that, when executed by the at least one processor, further cause the system to:

receive third data corresponding to at least the first user speaking the second content; and process the first data and the third data to determine fourth data representing a transformation between first speech characteristics and second speech characteristics, the first speech characteristics corresponding to the first content and the second speech characteristics corresponding to the second content, wherein the fourth data corresponds to the ML model.

16. The system of claim 11, wherein the first data further corresponds to a third user speaking the first content.

17. The system of claim 11, wherein:

the first content corresponds to a first wakeword; and the second content corresponds to a second wakeword different from the first wakeword.

18. The system of claim 11, wherein the first data corresponds to at least one quality of frequency domain audio data representing the first user speaking the first content.

19. The system of claim 18, wherein the at least one memory further comprises instructions that, when executed by the at least one processor, further cause the system to:

process the frequency domain audio data using a feature extraction component to determine the first data.

20. The system of claim 11, wherein the at least one memory further comprises instructions that, when executed by the at least one processor, further cause the system to:

receive annotation data corresponding to the first data, wherein configuration of the ML model further uses the annotation data.

* * * * *